United States Patent [19]

Nelson et al.

[11] Patent Number: 5,479,300

[45] Date of Patent: Dec. 26, 1995

[54] TAPE DUPLICATING SYSTEM

[75] Inventors: Alfred M. Nelson, Redondo Beach; Robert P. Adams, Santa Monica, both of Calif.

[73] Assignee: Hightree Media Corporation, El Segundo, Calif.

[21] Appl. No.: 189,175

[22] Filed: Jan. 28, 1994

Related U.S. Application Data

[63] Continuation of Ser. No. 733,174, Jul. 19, 1991, abandoned.

[51] Int. Cl.$^6$ .................................................. G11B 5/86
[52] U.S. Cl. ............................ 364/16; 369/59; 369/17
[58] Field of Search ........................... 360/16, 15, 93, 360/96.3, 96.4, 96.5, 96.6; 369/84

[56] References Cited

U.S. PATENT DOCUMENTS

| | | | |
|---|---|---|---|
| 3,465,105 | 9/1969 | Kumada et al. | 360/16 |
| 3,699,267 | 10/1972 | Hoell | 360/16 |
| 3,703,612 | 11/1972 | Higashida et al. | 360/16 |
| 3,824,617 | 7/1974 | Kobayashi et al. | 360/16 |
| 3,825,948 | 7/1974 | Hendershot, III et al. | 360/16 |
| 3,876,860 | 4/1975 | Nomura et al. | 360/16 |
| 3,928,747 | 12/1975 | Hanai et al. | 360/16 |
| 3,971,069 | 7/1976 | Hanai et al. | 360/16 |
| 3,971,070 | 7/1976 | Hanai et al. | 360/16 |
| 4,096,532 | 6/1978 | Ono et al. | 360/16 |
| 4,101,938 | 7/1978 | Hanai | 360/16 |
| 4,213,159 | 7/1980 | King | 360/16 |
| 4,631,602 | 12/1986 | Chouinard et al. | 360/16 |

FOREIGN PATENT DOCUMENTS 0240025 5/1986 European Pat. Off. .

OTHER PUBLICATIONS

"Laser Speeds Video–Tape Duplication", Machine Design, vol. 62, No. 16, pp. 60–61, Aug. 9, 1990.

Cole et al., "Thermomagnetic Duplication of Chromium Dioxide Videotape", IEEE Transactions on Magnetics, vol. Mag 20, No. 1, Jan. 1984, pp. 19–23.

*Primary Examiner*—Georgia Y. Epps
*Assistant Examiner*—Tan Dinh
*Attorney, Agent, or Firm*—Ellsworth R. Roston; Charles H. Schwartz

[57] ABSTRACT

A master tape moves between first supply and take-up reels over a pinch roller. A slave tape moves between second supply and take-up reels over a capstan. First and second guides are respectively constructed and positioned to regulate the movement of the master and slave tapes to aligned positions on the pinch roller and the capstan. A heater between the pinch roller and the second guide heats essentially only a thermomagnetic layer on the slave tape to at least the Curie temperature. The heater is adjustably positioned to facilitate the movement of the slave tape to the aligned position on the capstan. Brake shoes respectively between the first guide and the first supply reel, and between the second guide and the second supply reel, control master and slave tape tensions and damp any variations in tensions. The pinch roller is movable to a first position, locked in position relative to the capstan, to abut the capstan and facilitate the transfer of magnetic information from the master tape to the slave tape. In this disposition, the pinch roller locks the heater in a fixed position relative to the capstan. The pinch roller and the associated guide are movable to a second position displaced from the capstan to facilitate the disposition of the master tape on the pinch roller. The heater is pivotable relative to the capstan to facilitate the disposition of the slave tape on the capstan. The rotational axis of the capstan, preferably of a unitary construction, is fixed.

89 Claims, 16 Drawing Sheets

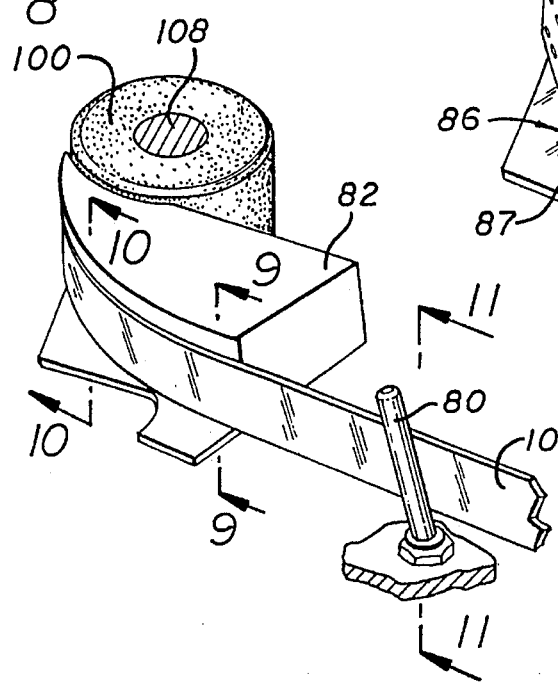
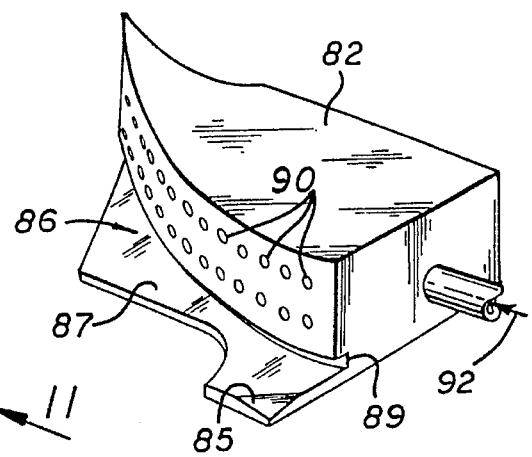
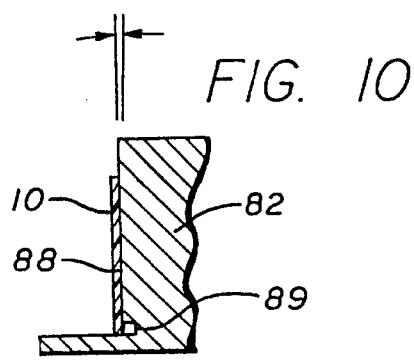
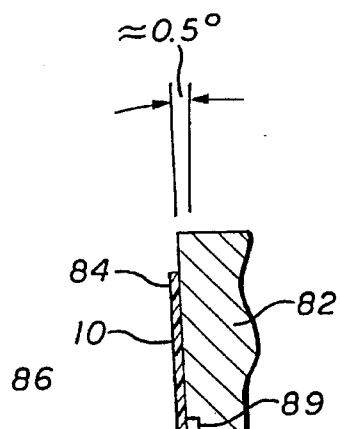
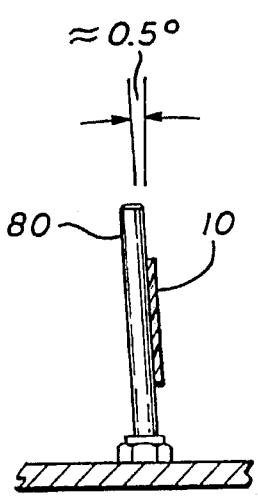

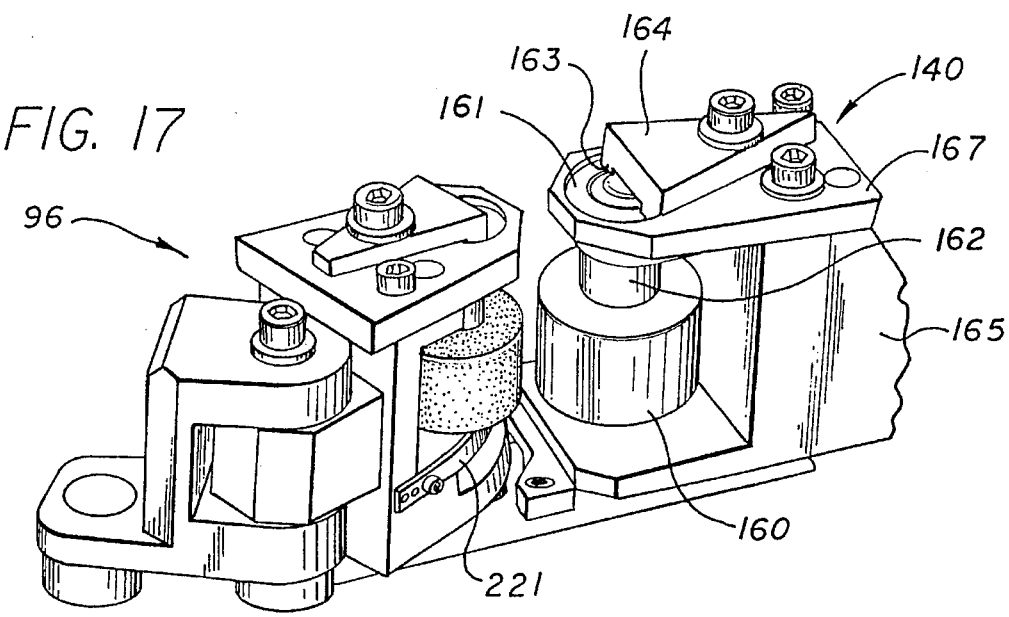
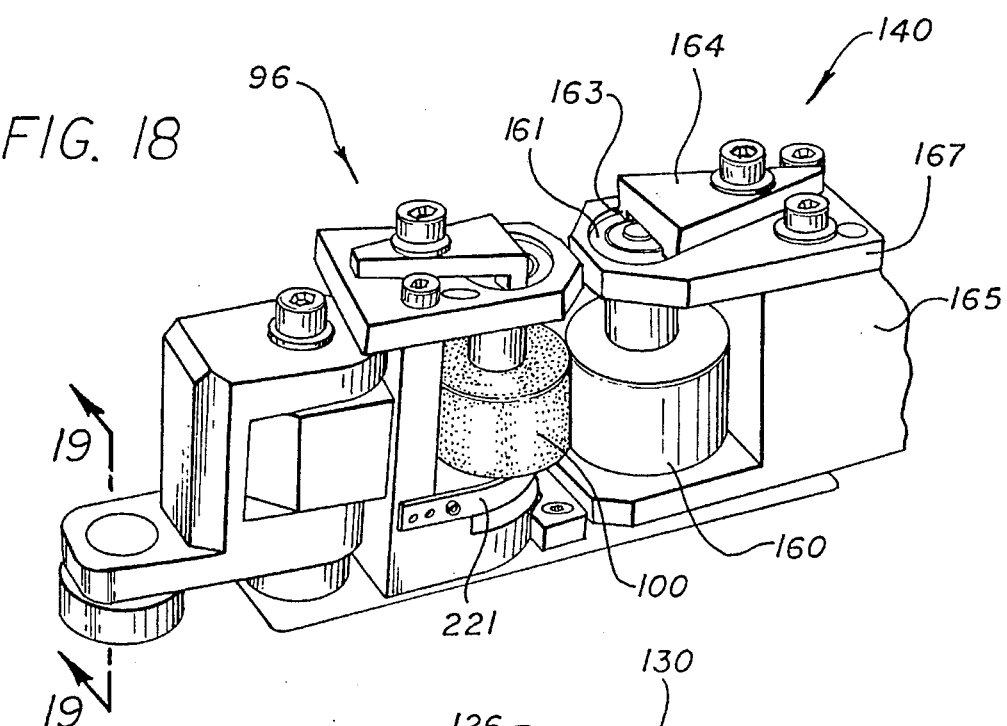
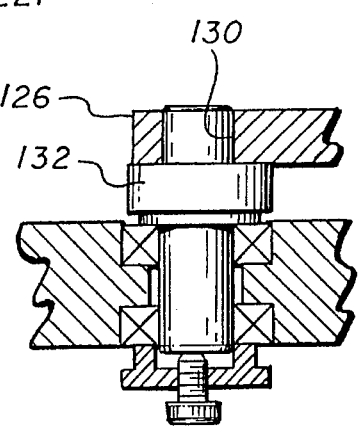

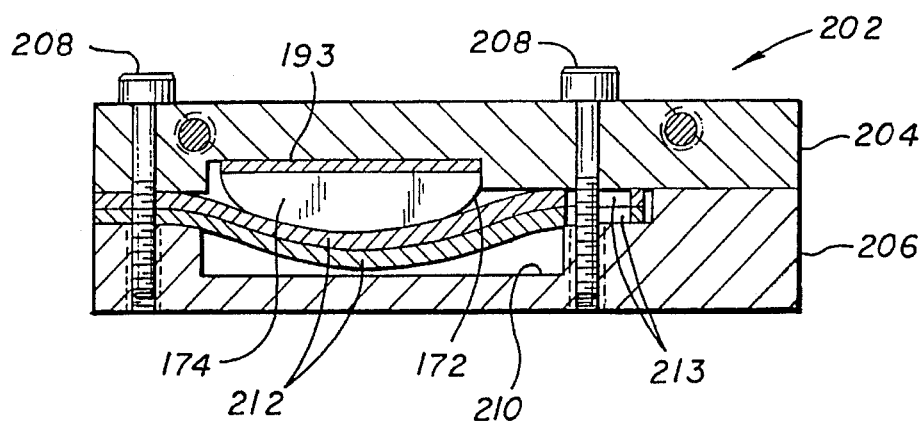
FIG. 27
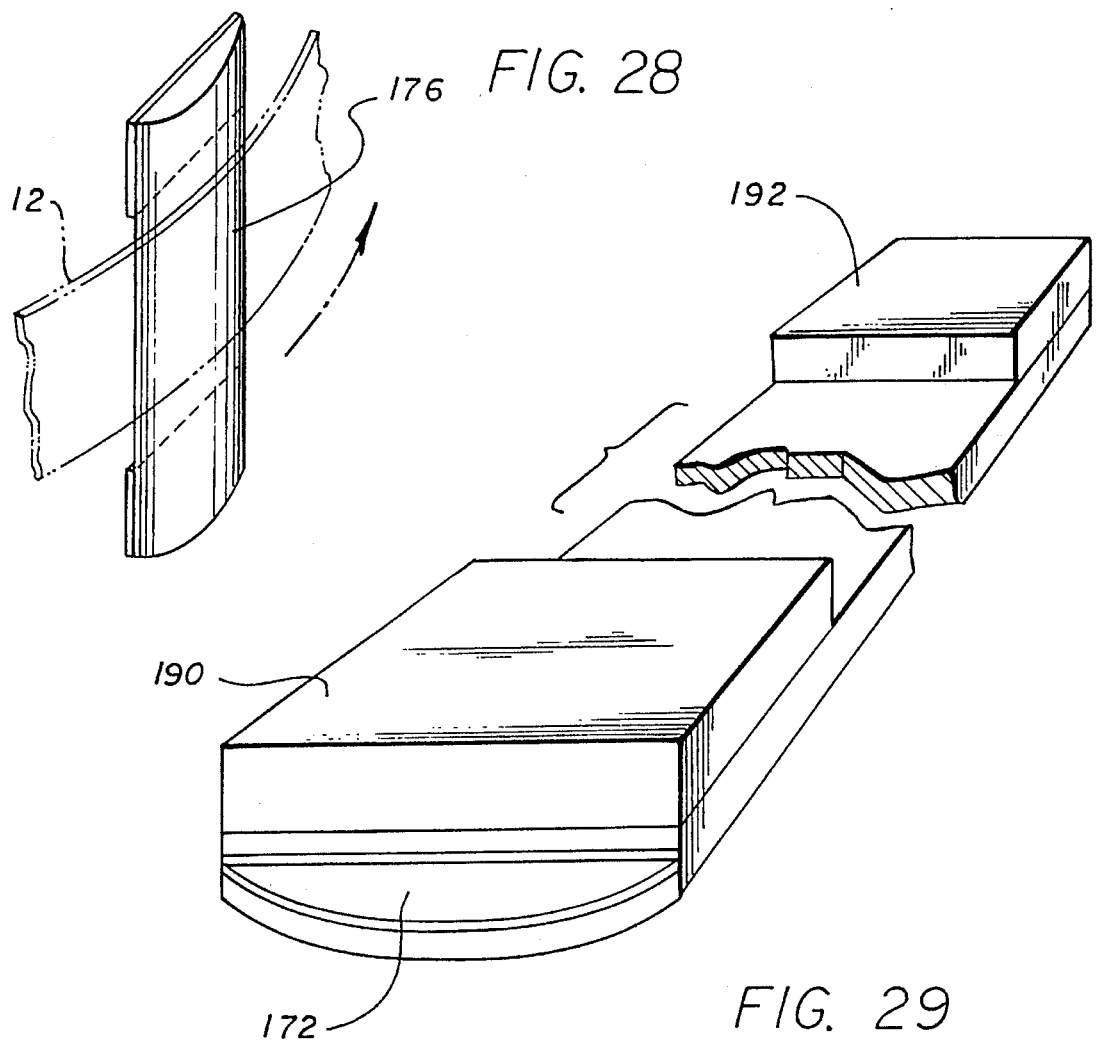
FIG. 28
FIG. 29

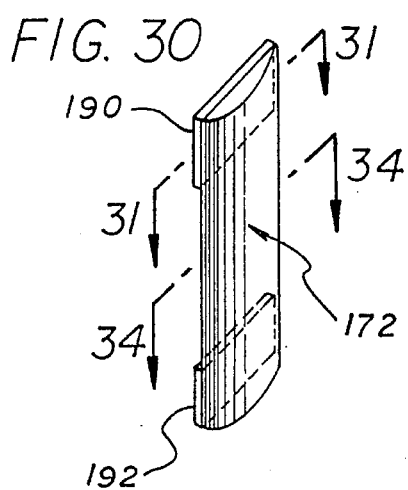
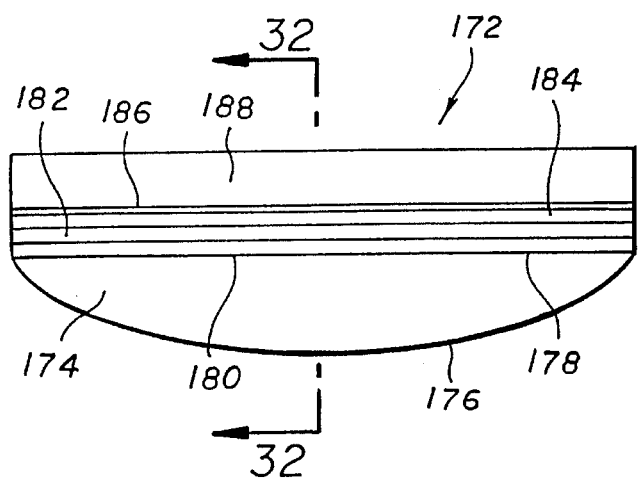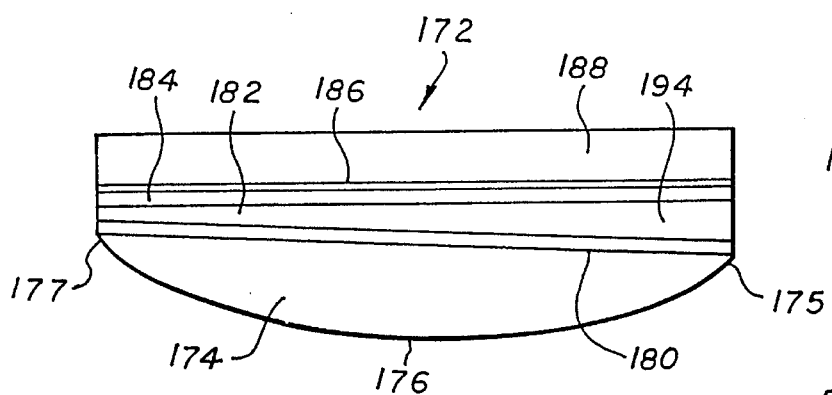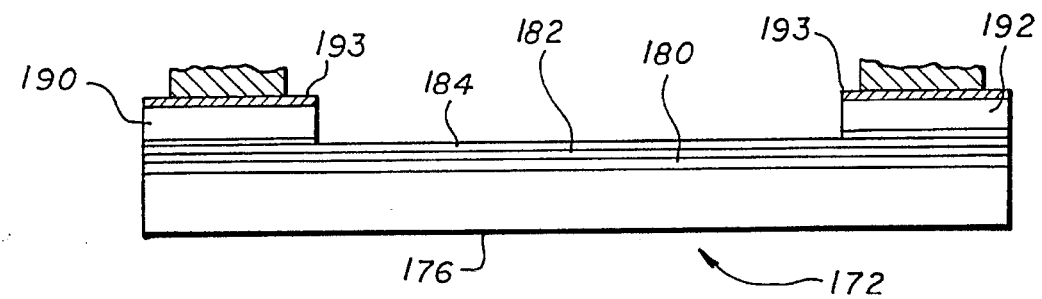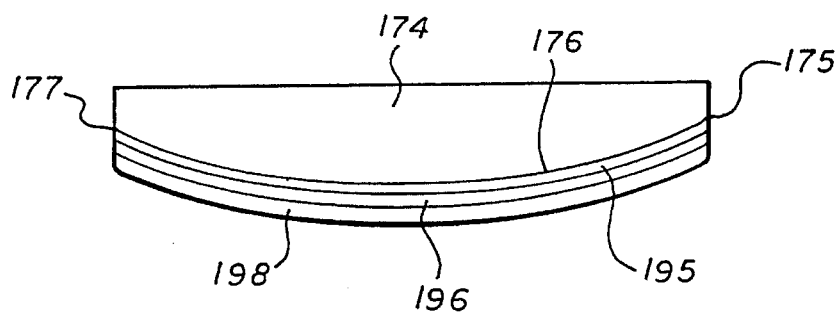

TAPE DUPLICATING SYSTEM

This is a continuation of application Ser. No. 07/733,174 filed Jul. 19, 1991, now abandoned.

This invention relates to apparatus for, and methods of, transferring visual and aural information on a master tape to a slave tape. More particularly, this invention relates to apparatus for, and methods of, transferring visual and audio information in magnetic form on a master tape to a thermomagnetic layer on a slave tape.

visual and audio information is often stored on a tape for playback at a subsequent time. For example, visual and audio information relating to popular motion pictures is stored on tapes. These tapes are rented or sold at neighborhood stores. A popular movie such as "Batman" or a movie winning an Academy Award has millions of taped copies distributed to satisfy the demands of purchasers and renters. Substantially all of these taped copies have to be made available at a pre-selected release date in order to satisfy the pent-up demand of viewers for such taped copies. Although the demand for movie rentals and sales is great, it still seems to be increasing significantly from year to year.

Visual and audio information on tapes is not only provided in the form of movies for entertainment. It is also provided in large volume for business purposes. For example, large corporations deliver messages in the form of tapes to their sales personnel to acquaint such sales personnel with the construction, operation and advantages of new products. Since large corporations employ large numbers of sales copies, many copies of such messages have to be prepared for distribution to their sales personnel.

The visual and audio information on most tapes is in magnetic form. One reason is that information in magnetic form can be relatively easily and inexpensively reproduced. For example, most reproducing apparatus in the home use magnetic heads to read the information recorded magnetically on the tapes when the tapes are inserted into such apparatus. Another reason is that tapes with information recorded in magnetic form are less expensive to reproduce than tapes in other forms such as in optical form.

One type of tape for recording information in magnetic form has a thermomagnetic layer on the tape. The thermomagnetic layer may be formed from a suitable material such as chromium dioxide. The thermomagnetic layer has a Curie temperature at or above which any magnetic information on the tape is destroyed and below which magnetic information can be recorded on the tape. Thermomagnetic tape is advantageous because information can be recorded on the thermomagnetic tape at a temperature at or somewhat above the Curie temperature by pressing a master tape against the thermomagnetic layer on the slave tape at such a temperature. This causes the surface of the thermomagnetic layer to become cooled to a temperature below the Curie temperature by contact with the cool surface of the master tape. As the thermomagnetic layer cools to a temperature below the Curie temperature, the magnetic information on the magnetic tape becomes transferred to the thermomagnetic layer on the slave tape. The information on the master tape thus becomes transferred in mirror form to the thermomagnetic layer on the slave tape without having to use any magnetic heads to write information on the slave tape.

There is at least one apparatus now in use for transferring information in magnetic form on a master tape to a thermomagnetic layer on a slave tape. Although this apparatus is fast, it is large, cumbersome, expensive, and requires excessive electrical power.

With the millions of copies that have to be made of a single movie such as the movie winning an Academy Award, it would be desirable to provide apparatus which is relatively inexpensive and which transfers information from a master tape to a slave tape in a minimal period of time. For example, it would be desirable to provide equipment which sells at most for a few thousand dollars and which reproduces a two (2) hour movie in approximately thirty (30) to sixty (60) seconds without any need for using magnetic reproducing heads. Because of the desire, and actually the need, for such apparatus, a considerable effort has been devoted, and a significant amount of money has been expended, to develop apparatus which meet such criteria. In spite of such effort and such money expenditure, no satisfactory apparatus meeting such criteria has been provided to this date.

This invention provides apparatus which more than meets the criteria specified in the previous paragraph. It is able to record a two (2) hour movie in approximately thirty (30) to sixty (60) seconds such that the duplicated copy has the visual and audio fidelity of the original or master copy. It is compact so that it occupies relatively little space. This is important when a large number of apparatuses are used simultaneously in an enclosure such as a room to make duplicate copies. For example, the apparatus can be used to transfer the information on a master-master tape to a master tape, and subsequently the same apparatus can be used to transfer the information on the master tape to the slave tape, all without using recording heads. It also consumes low amounts of power.

In one embodiment of the invention, a master tape moves between first supply and take-up reels over a pinch roller. A slave tape moves between second supply and take-up reels over a capstan. First and second guides can be respectively constructed and adjustably positioned to regulate the movement of the master and slave tapes to aligned positions on the pinch roller and the capstan. A heater disposed between the pinch roller and the second guide heats only a thermomagnetic layer on the slave tape to at least the Curie temperature. The heater is adjustable in position to facilitate the movement of the slave tape to the aligned position on the capstan. A brake shoe between the capstan and the second supply reel controls the tape tension and damps any variations in the tension of the slave tape. A brake shoe between the pinch roller and the first supply reel controls the tape tension and damps any variations in the tension of the master tape.

The pinch roller is movable to a first position and locked in position relative to the capstan, in which it abuts the capstan to facilitate the transfer of magnetic information from the master tape to the slave tape. In this disposition, the pinch roller locks the heater in a fixed position relative to the capstan. The pinch roller and the associated guide are movable to a second position displaced from the capstan to facilitate the disposition of the master tape on the pinch roller. The heater is pivotable relative to the capstan to facilitate the disposition of the slave tape on the capstan. The capstan, preferably of a unitary construction, receives forces to maintain the capstan rotational axis substantially constant.

In the drawings:

FIG. 8 is an enlarged perspective view of a portion of the apparatus included in FIG. 1 and specifically illustrates the construction of a guide pin, a guide member and a pinch roller and the disposition of these members in the path of movement of the master tape;

FIG. 8A is an enlarged perspective view of the external surface of the guide means shown in FIG. 8;

FIG. 9 is an enlarged fragmentary sectional view taken substantially on the line 9—9 of FIG. 8 and illustrates in additional detail the construction of the guide member for the master tape at the input end of the guide member in the direction of movement of the master tape;

FIG. 10 is an enlarged fragmentary sectional view taken substantially on the line 10—10 of FIG. 8 and illustrates additionally the construction of the guide member for the master tape at the output end of the guide member;

FIG. 11 is an enlarged fragmentary sectional view taken substantially on the line 11—11 of FIG. 8 and illustrates in further detail the construction of the guide pin for the master tape in the direction of movement of the master tape;

FIG. 17 is an enlarged perspective view of the pinch roller and the associated guide member and of capstan assembly, as seen from a position above and in front of these members, when the pinch roller and the guide member have been extended almost to the position of the pinch roller abutting the capstan;

FIG. 18 is an enlarged perspective view of the pinch roller and the associated guide member and the capstan assembly, as seen from a position above and in front of these members, when the pinch roller and the guide member have been extended to the position of the pinch roller abutting the capstan;

FIG. 19 is an enlarged fragmentary sectional view taken substantially on the line 19—19 of FIG. 18 and illustrates the construction of an assembly for providing for the movement of the pinch roller and the associated guide member between the withdrawn and extended positions;

FIG. 27 is an enlarged sectional view taken substantially on the line 27—27 of FIG. 22 and illustrates the heater and the construction of members for holding the heater in a fixed position on the heater assembly;

FIG. 28 is a schematic perspective view illustrating the disposition of the slave tape on the heater;

FIG. 29 is an enlarged fragmentary perspective view of the heater and illustrates additional details concerning the construction of the heater;

FIG. 30 is a perspective view of the heater for instantaneously heating the thermomagnetic layer on the slave tape to a temperature above the Curie temperature;

FIG. 31 is an enlarged fragmentary sectional view taken on the line 31—31 of FIG. 30 and illustrates the different layers of material which are disposed on an electrically insulating support member to form one embodiment of the heater;

FIG. 32 is an enlarged sectional view taken substantially on the line 32—32 of FIG. 31 and illustrates additional details of the embodiment of the heater shown in FIGS. 27–31;

FIG. 33 is an enlarged fragmentary sectional view corresponding to the view shown in FIG. 31 and illustrates a modification of the heater shown in FIG. 31;

FIG. 34 is an enlarged fragmentary sectional view taken substantially on the line 34—34 of FIG. 30 and illustrates a modification to the embodiment shown in FIG. 31;

Figure 37:
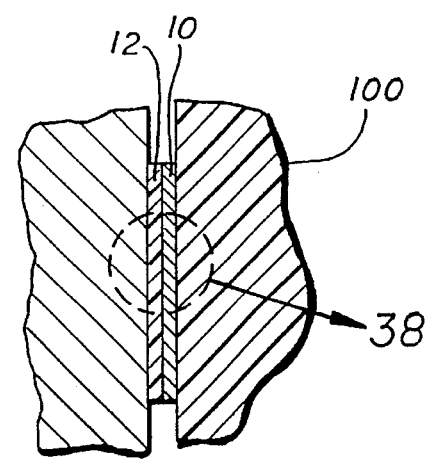
FIG. 37 is an enlarged fragmentary sectional view taken substantially on the line 37—37 of FIG. 35 and illustrates a portion of the pinch roller and the capstan and the master and slave tapes with the master and slave tapes in abutting relationship to each other and to the pinch roller and the capstan.
Figure 38:
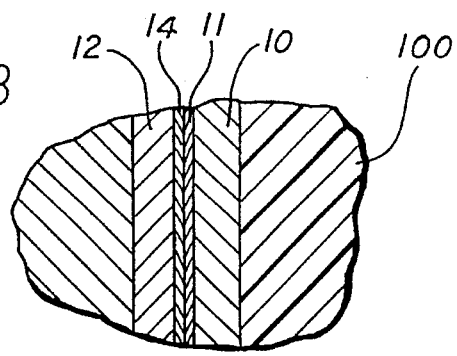
Figure 39:
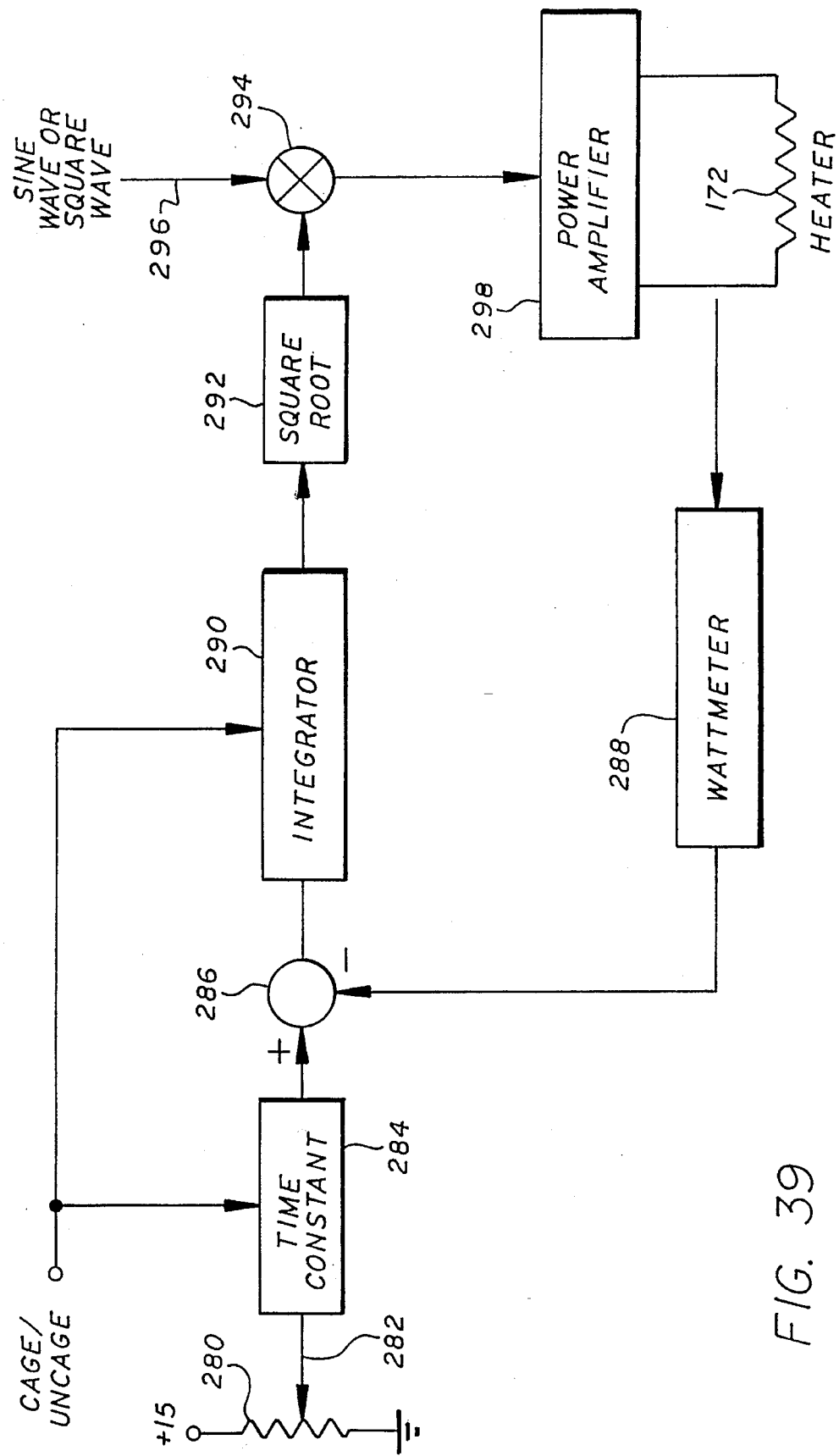

FIG. 38 is a fragmentary sectional view, enlarged with respect to FIG. 37, of the portion of the members within the broken circle designated by the numeral "38" in FIG. 37 and particularly illustrates the abutting relationship of the magnetic layer on the master tape and the thermomagnetic layer on the slave tape; and FIG. 39 is a schematic block diagram of a system for regulating the heat produced by the heater for the thermomagnetic layer on the slave tape and for providing a rapid heating of the heater on a regulated basis when the apparatus shown in the previous Figures initially becomes operative.

In one embodiment of the invention, a master tape 10 (FIG. 1) is provided with a mirror image of information such as visual pictures and aural sound to be reproduced on a slave tape 12. Preferably the mirror image of the visual and aural information is recorded in magnetic form on the master tape 10. The mirror image may be recorded in either analog or digital form. The visual and aural information may be provided in a layer 11 (FIG. 38) of a magnetizable oxide such as an iron oxide on the surface of the master tape. The magnetizable layer 11 may be formed in a conventional manner on the master tape 10.

A slave tape 12 (FIGS. 1 and 38) preferably has a thermomagnetic layer 14 (FIG. 38) on the tape. The thermomagnetic layer 14 may be formed on the slave tape 12 from a suitable material such as chromium dioxide in a manner well known in the art. The thermomagnetic layer 14 preferably has a Curie temperature above which magnetic information in the thermomagnetic layer is destroyed and below which the magnetic information on the master tape can be duplicated in the mirror image on the thermomagnetic layer 14 on the slave tape. Preferably the duplication occurs at a temperature close to the Curie temperature. When this occurs, the duplication can occur by pressing the master and slave tapes together and can occur without any need to provide magnetic heads for recording the magnetizable information from the master tape 10 on the slave tape 12. It will be appreciated that the magnetic layer 11 on the master tape 10 may also be formed from a thermomagnetic material.

Figure 1:
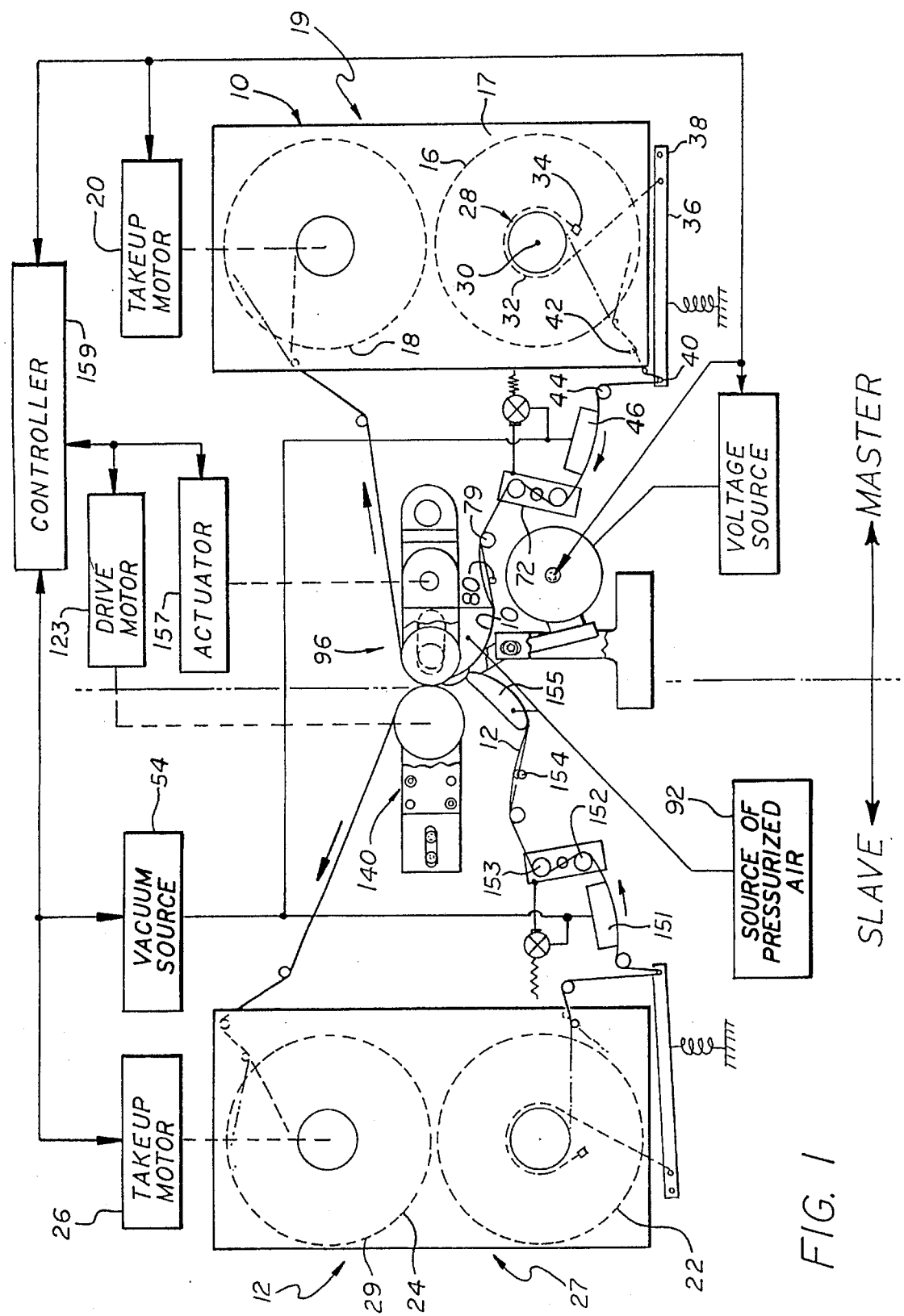
FIG. 1 is a schematic plan view, partly in block form, of one embodiment of apparatus for transferring the information, preferably in magnetic form, on a master tape to a slave tape.
Figure 2:
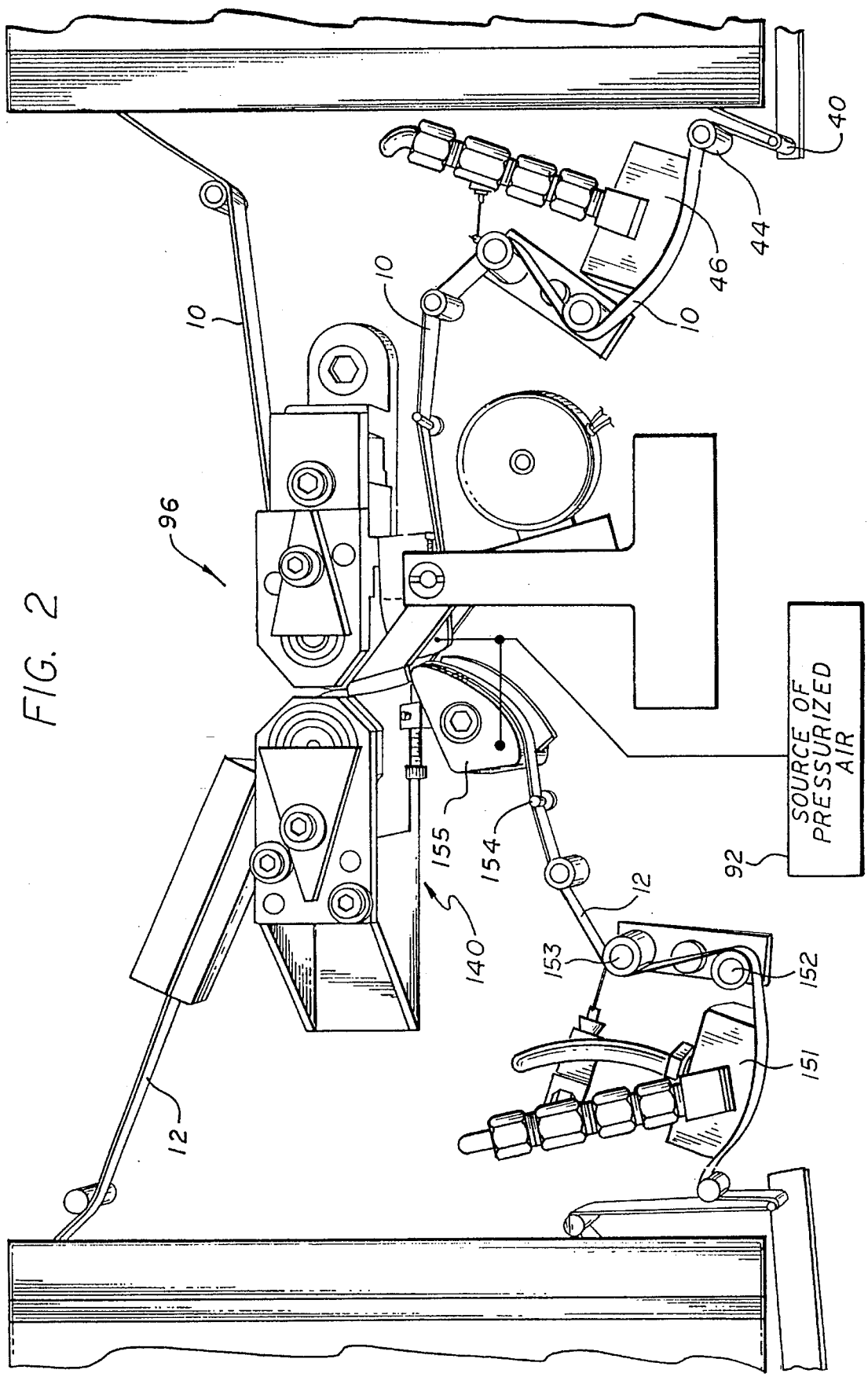
FIG. 2 is an enlarged perspective view of a portion of the apparatus shown in FIG. 1 and illustrates this portion of the apparatus in additional detail, this portion including the members adjacent to and including the position where the information on the master tape is transferred to the slave tape.

The master tape 10 can be initially wound on a supply reel or cassette 16 and can then be unwound from the supply reel 16 and wound on a take-up reel 18. The unwinding of the master tape 10 from the supply reel 16 by a capstan motor 123 (FIG. 1) and the winding of the master tape on the take-up reel 18 can occur through the operation of a takeup motor 20 (FIG. 1). The cassettes 16 and 18 and the takeup motor 20 can be constructed in a conventional manner as in a VCR cassette found in many homes. The VCR video cassette is generally indicated at 19 in FIG. 1. The cassette 19 has a housing 17 for holding the supply reel 16 and the take-up reel 18. Similarly, a supply reel 22, a takeup reel 24 and a takeup motor 26 can be provided for the slave tape 12. The supply reel 22 and the take-up reel 24 can be constructed in a conventional manner as in a VCR cassette generally indicated at 27. The cassette 27 has a housing 29 for holding the supply reel 22 and the take-up reel 24.

Figure 3:
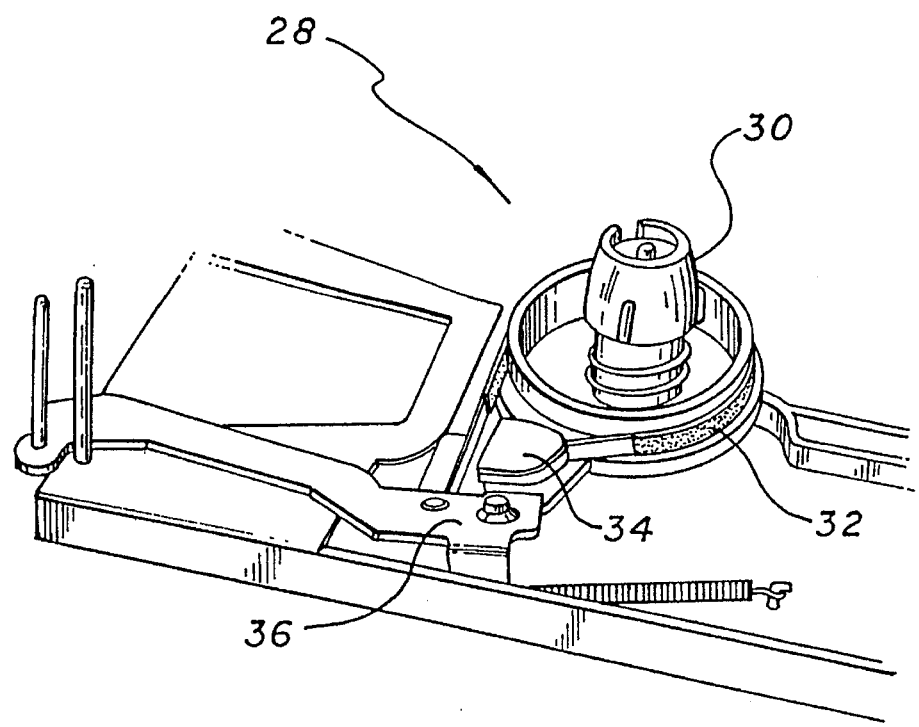
FIG. 3 is an enlarged perspective view of braking apparatus associated with a supply reel or cassette (also shown in FIG. 1) for controlling the unwinding of a tape from the supply reel.
Figure 4:
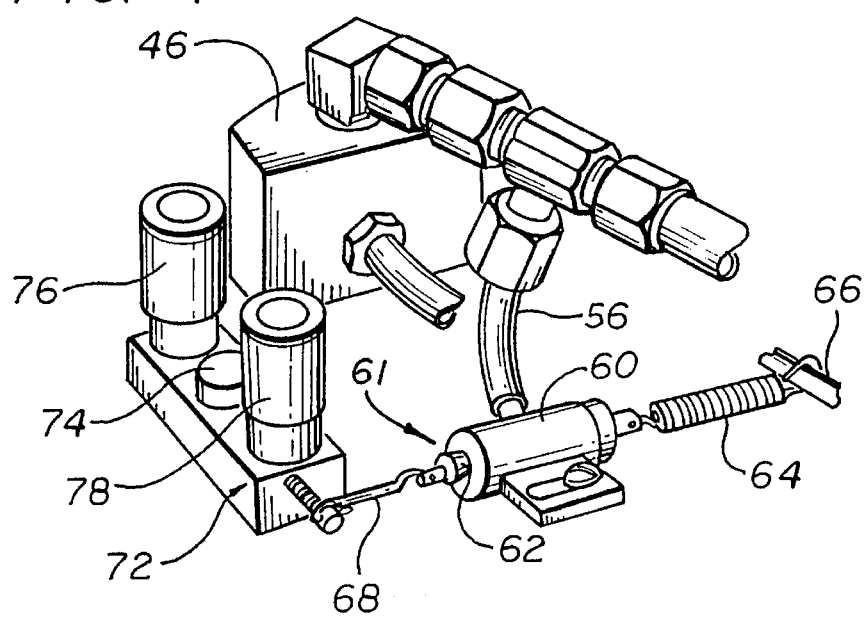
FIG. 4 is an enlarged perspective view of a brake shoe and associated members (also shown in FIG. 1) for regulating the tension of the tape at a position between the supply reel and the position of transfer of information from the master tape to the slave tape.

An annular control member 28 (FIGS. 1 and 3) is disposed in a concentric relationship with the cassette 16 on a shaft 30. A strap 32 is wound partially around the shaft 30 and is attached at one end as at 34 to a mechanical ground. At the other end, the strap 32 is attached to an intermediate position on a rod 36 which is pivotable at one end as at 38. At its other end, the rod 36 has a pin 40. The construction and arrangement of the annular control member 28, the shaft 30, the strap 32 and the rod 36 are well known in the art of video cassette recording and reproducing equipment. A similar arrangement may also be provided in association with the supply reel 22.

The master tape 10 extends from the supply reel 16 over a pin 42, the pin 40 on the rod 36 and a pin 44 to the external periphery of a brake shoe 46 (FIGS. 1, 2, 4, 5 and 7). The brake shoe 46 is provided with a hollow interior 48 (FIG. 5) and with orifices 50 (FIGS. 5 and 7) on its external surface. A conduit 52 (FIG. 5) extends from the hollow interior 48 of the brake shoe 46 to a vacuum source 54. A bypass conduit 56 extends from the conduit 52 and communicates with a port 58 in a valve housing 60.

A valve spool 62 defines a valve, generally indicated at 61, with the valve housing 60. The valve spool 62 is attached to one end of a rod 63, the other end of which is attached to one end of a spring 64. The other end of the spring 64 is in turn retained by a fixed post 66. A string or wire 68 extends from the spool 62 to a lug 70 extending in an adjustable positioning from a support member 72. The support member 72 is disposed on a pin 74 in pivotable relationship to the pin. A pair of posts 76 and 78 are disposed on the support member 72 on opposite sides of the pivot pin 74. The master tape 10 extends from the periphery of the brake shoe 46 over the posts 76 and 78.

After extending over the posts 76 and 78, the master tape 10 extends over a post 79 (FIG. 1) and a guide pin 80 (FIGS. 1, 9, and 11). The surface 84 of the alignment guide is inclined at a small angle (FIG. 9). This small angle causes the tape to ride down to ledge 86, thus accurately aligning the tape to the ledge height. A tilted guide pin 80 provides compensation for the differential strain introduced by the sloped surface 84 of the alignment guide 82. The optimum tilt angle is a function of the wrap angle and the slope of the alignment guide. If the tilt is too large, the tape will ride up off the ledge of the alignment guide at the input end. If the tilt is too small, excessive force will be created on the tape edge. This can result in a buckling of the tape at the input end of the alignment guide.

Just prior to the exit of the guide, the slope of the guide face transitions to a perpendicular relationship with the pinch roller (FIG. 10). Thus the tape exits the guide in a plane parallel to the pinch roller axis and without differential strain. The bevelled surface 84 is undercut as at 89 (FIGS. 8A, 9 and 10) to assure that the tape will have a planar disposition along the bevelled surface. The external surface of the guide 82 is provided with a vertical disposition, as indicated at 88 in FIG. 10, at the output end of the guide in the direction of movement of the tape.

The guide 82 may be hollow and apertures 90 (FIG. 8A) may be provided in the periphery of the guide 82 on the surface receiving the master tape 10. A pneumatic force may accordingly be produced on the external surface of the guide 82 as from a source 92 of air under pressure. The pneumatic 7 force on the external surface of the guide 82 provides the external surface of the guide with frictionless properties so that the tape tension control provided at the exit of the tape from the roller 78 (FIG. 5) is not compromised.

Figure 24:
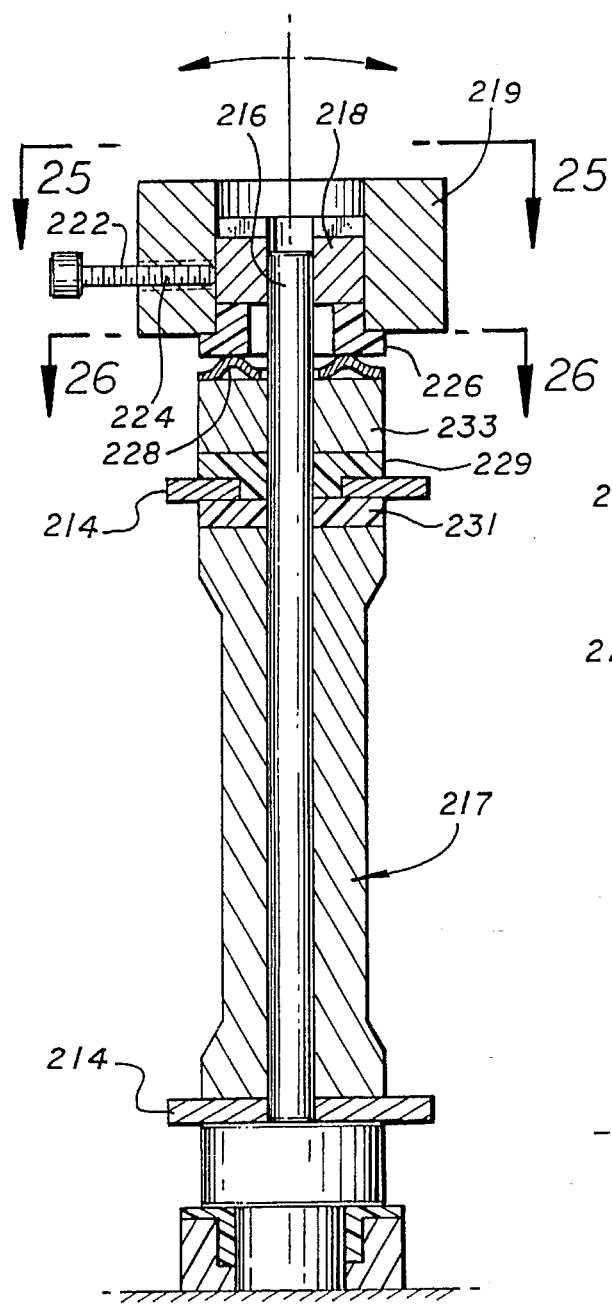
FIG. 24 is an enlarged fragmentary sectional view taken substantially on the line 24—24 of FIG. 22 and illustrates the construction of the pivot assembly for pivoting the heater assembly between a position with the heater receiving the slave tape and a withdrawn position and further illustrates the members for tilting the heater assembly relative to the capstan.
Figure 25:
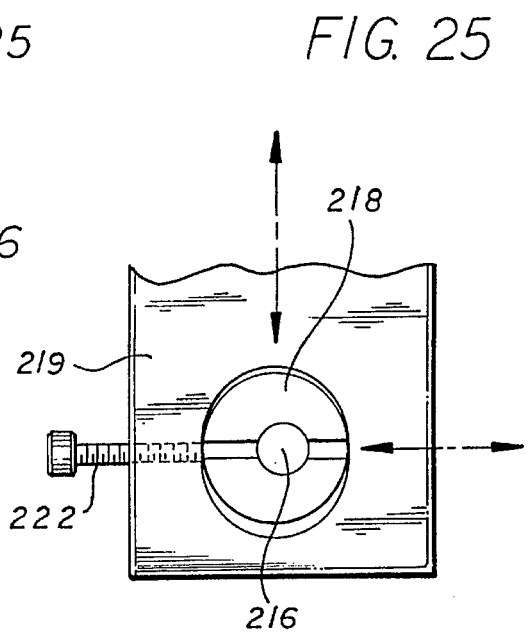
FIG. 25 is an enlarged fragmentary sectional view taken substantially on the line 25—25 of FIG. 24 and illustrates in additional detail the construction of the members for tilting the heater assembly relative to the capstan.
Figure 26:
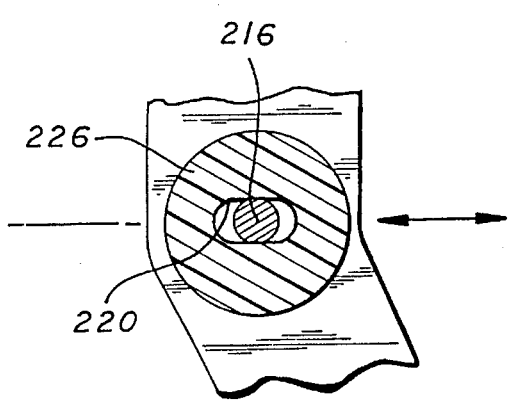
FIG. 26 is an enlarged fragmentary view taken substantially on the line 26—26 of FIG. 24 and illustrates in further detail the construction of the members for tilting the heater assembly relative to the capstan.

The guide 82 (FIGS. 12–13) is coupled as by bolts 98 to a pinch roller assembly generally indicated at 96. The pinch roller assembly 96 includes the pinch roller 100. The guide 82 is adjustably positioned relative to the pinch roller 100 as by a pair of eccentrics 104 and 106 (FIGS. 12, 12A, 12B and 13). The eccentric 104 may be operative to move the guide 82 vertically in accordance with the rotation of the eccentric. The eccentric 106 may be operative to move the guide 82 vertically so as to adjust the tilt of the guide 82 relative to the pinch roller 100. It is believed that the construction of eccentrics such as the eccentrics 104 and 106 are well known to persons of ordinary skill in the art. Furthermore, the construction of the eccentric 106 may correspond to the construction of the eccentric shown in FIGS. 24–26. Although the construction of the eccentrics 104 and 106 is considered to be well known in the art, the use of such eccentrics in a pinch roller assembly is not believed to be known in the art.

The pinch roller 100 may be molded on a shaft 108 and may be constructed from a suitable material such as a polyurethane. Polyurethane is a desirable material because it has very good wear characteristics and because it does not take a permanent set from continued pressure from a capstan abutting the pinch roller in the operative relationship of the pinch roller and the capstan. Polyurethane is also desirable from the standpoint of its ability to adhere to the shaft 108 and also from the standpoint of having a low hysteresis in resisting the effects of heat. A suitable polyurethane for use as the pinch roller 100 may be obtained from Harkness in Bristol, Conn. This polyurethane may have a hardness of 60 Shorr on the A scale. As will be seen from the subsequent discussion, the pinch roller 100 is subjected to considerable heat from the slave tape 12 when the slave tape abuts the master tape 10.

Figures 13, 14:
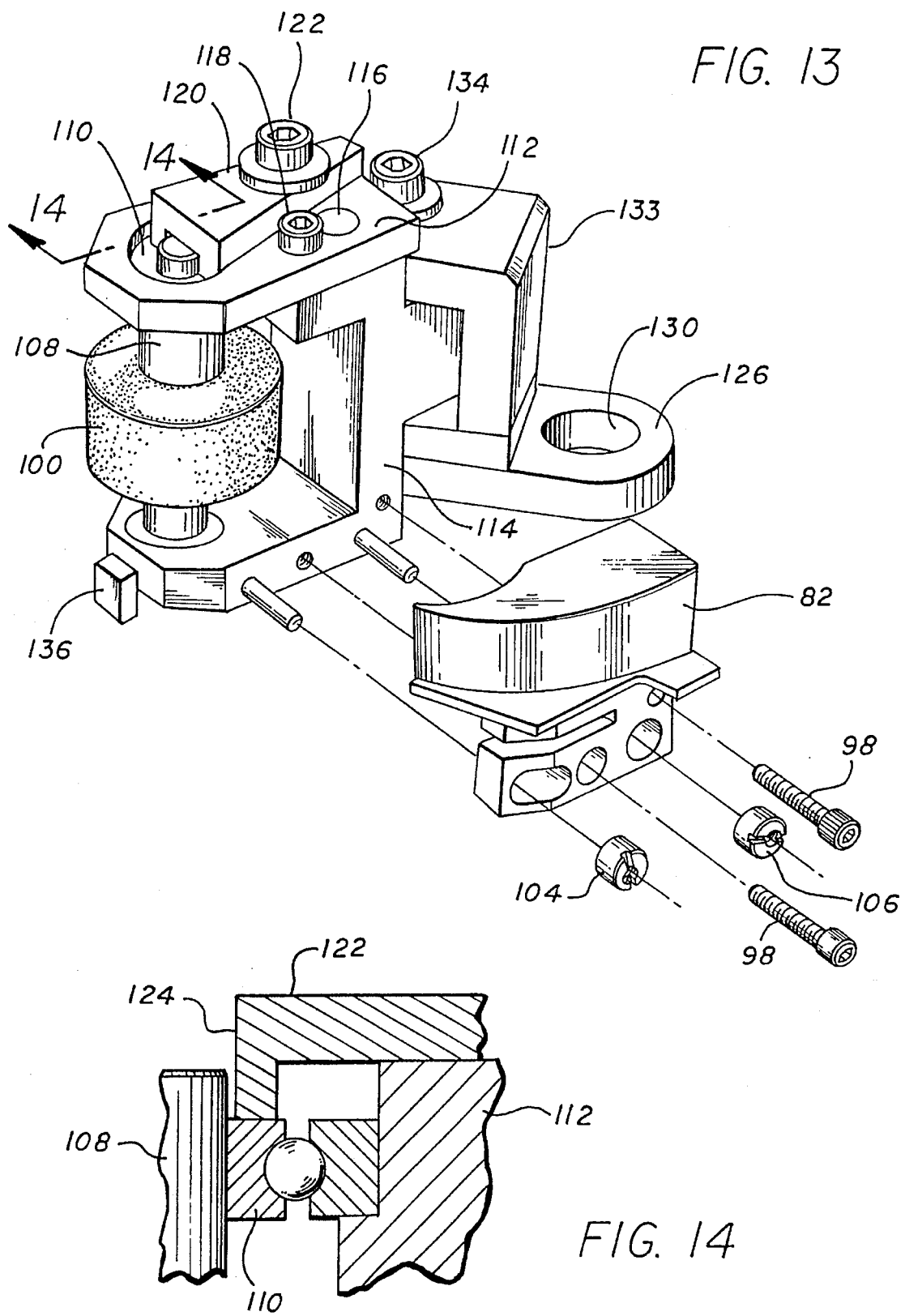
FIG. 13 is an enlarged, partly exploded, perspective view of the pinch roller and the guide member with the pinch roller and the guide member in the withdrawn position.
FIG. 14 is an enlarged fragmentary sectional view taken substantially on the line 14—14 of FIG. 13 and illustrates a bearing assembly associated with the pinch roller for assuring that the pinch roller does not rotate in an off-round relationship.

The shaft 108 is supported in a bearing 110 (FIG. 13 and 14) on a support plate 112 which is supported on a knuckle support 114 (FIG. 13). The support plate 112 is precisely positioned on the knuckle support 114 as by pins 116 and is then secured to the frame as by threaded bolts 118. A bearing plate 120 is secured to the top of the support plate 112 as by a threaded bolt 122. The bearing plate 120 is provided with lugs 124 (FIG. 14) which extend downwardly and engage the bearing 110 to create a force having axial and radial components, on the bearing, the radial component of the force being directed inwardly toward the shaft 108. This force prevents the pinch roller 100 from being off-round as the pinch roller 100 rotates and presses against the capstan during such rotation. This force also prevents axial displacement of the pinch roller 100. The polyurethane pinch roller 100 is also preferably ground on centers to obtain a run-out of less than two ten-thousandths of an inch (0.0002").

The attention devoted to the pinch roller 100 and the supporting structure as discussed above assures that the pinch roller 100 will not wobble as it rotates. Wobbling of the pinch roller 100 is undesirable because it creates inaccuracies in the transfer of magnetic information from the master tape 10 to the thermomagnetic layer 14 on the slave tape 12. The pinch roller 100 is rotated by the capstan as a result of tension between the master tape 10 and the slave tape 12.

Figure 12:
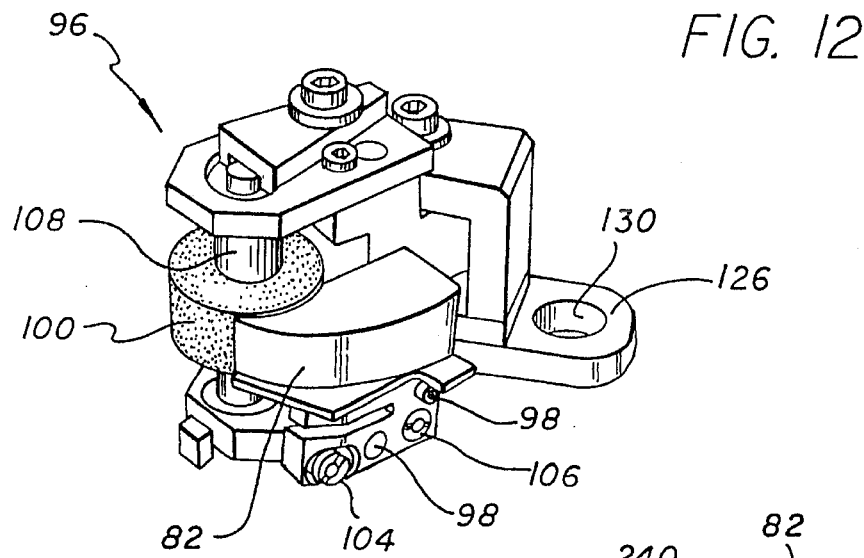
FIG. 12 is an enlarged perspective view of the pinch roller and the guide member, as seen from a position above and to one side of these members, for receiving the master tape, the pinch roller being disposed in a position withdrawn from an abutting relationship with a capstan.
Figure 12A:
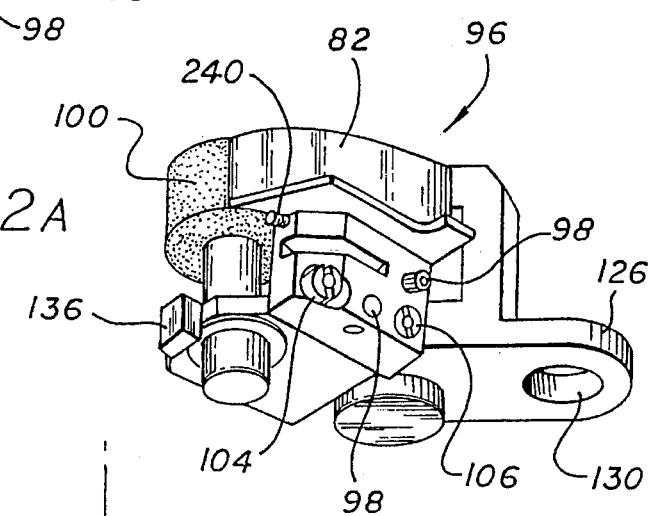
FIG. 12A is an enlarged perspective view of the pinch roller and guide means shown in FIG. 12 as seen from a position below and to the other side of these members with the pinch roller and the guide means in the withdrawn position.
Figure 12B:
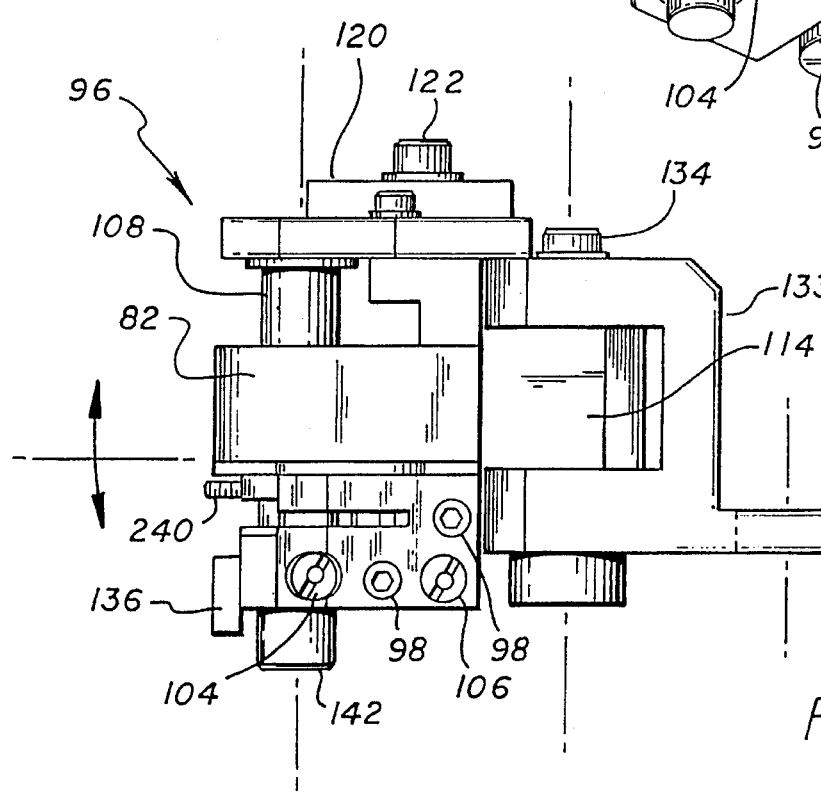
FIG. 12B is an enlarged elevational view of the pinch roller and the guide member with the pinch roller and the guide member in the extended position.
Figure 15:
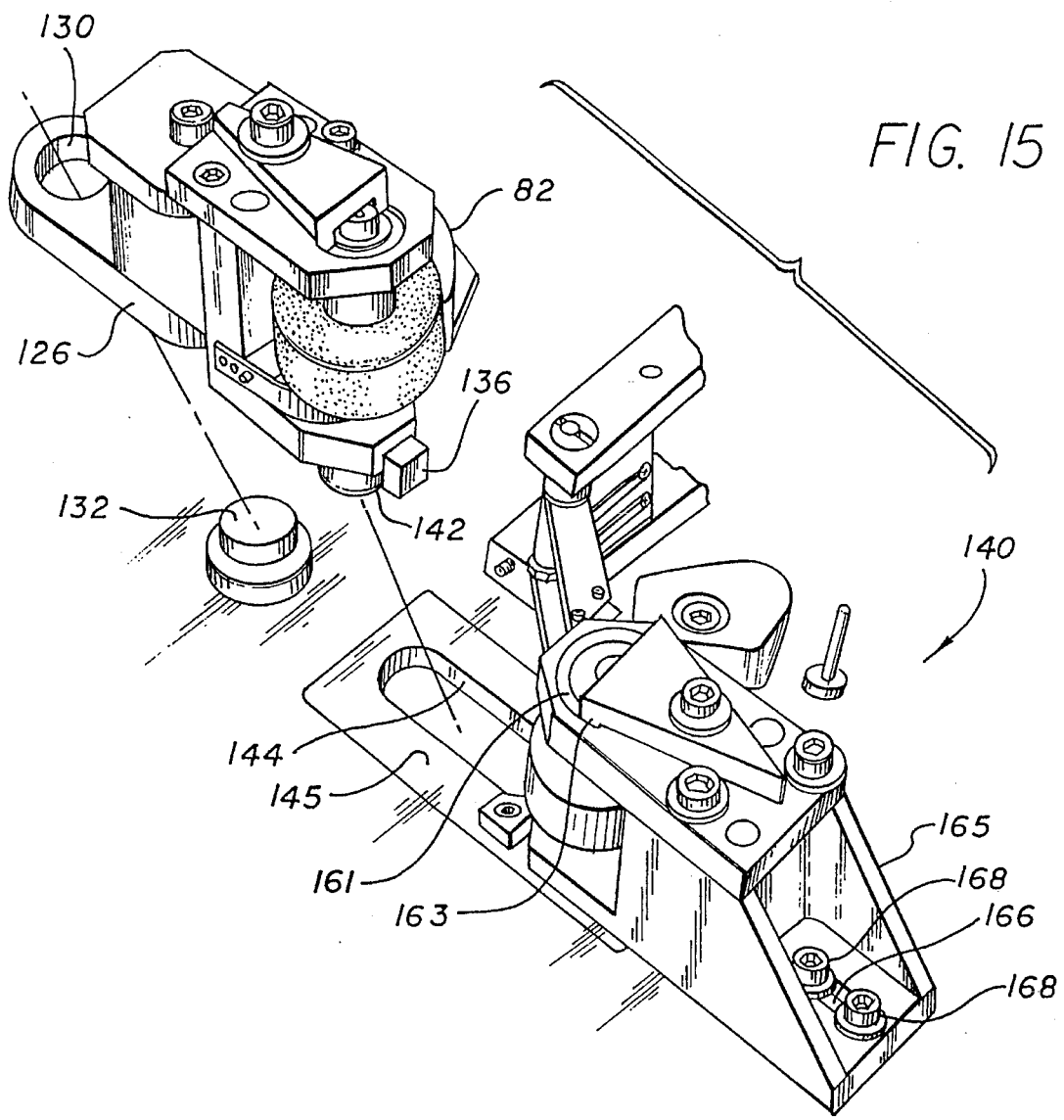
FIG. 15 is an enlarged exploded perspective view of the pinch roller and guide member shown in FIGS. 12–14 and of the capstan assembly, as seen from a position above and to one side of these members, with the pinch roller and the guide member in the extended relationship shown in FIG. 18.

The pinch roller assembly 96 includes a base member 126 (FIGS. 12–13 and 15) extending from the bottom of the knuckle support 114. The member 126 has a hole 130 for receiving a positioning knuckle 132 (FIG. 15) to provide for a rotation of the knuckle support 114 on the knuckle 132. The base member 126 forms a part of a frame 133. The knuckle support 114 is pivotably secured to the frame 133 as by a pivot pin 134 (FIGS. 12B and 13). An adjustable screw 135 (FIG. 23) is disposed on a post 137 to adjust the position of the knuckle 132 (FIG. 15).

Figure 16:
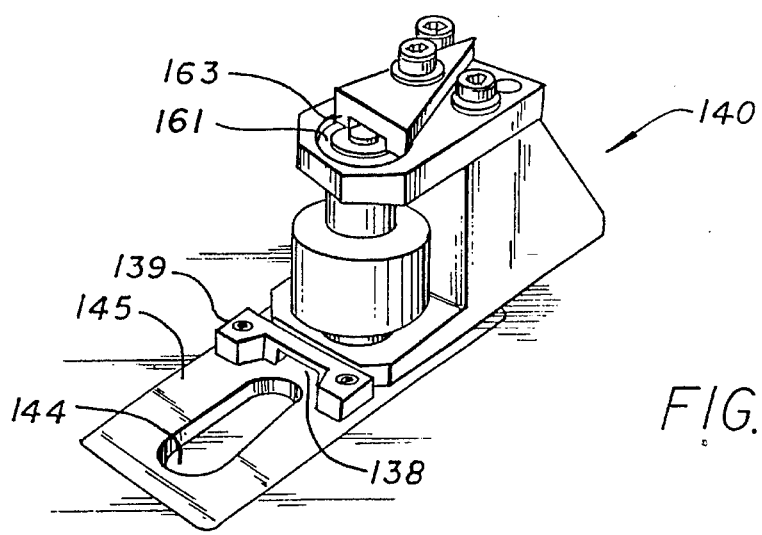
FIG. 16 is an enlarged perspective view of the capstan assembly, as seen from a position above and to the other side of the capstan assembly.

A lug 136 (FIG. 13) extends from the bottom of the knuckle support 114 and cooperates with a recess 138 (FIG. 16) in a positioning member 139 of a capstan assembly generally indicated at 140 to define a detent arrangement with the recess for locking the pinch roller assembly 96 to the positioning member 139. A bearing 142 (FIG. 15) on the end of the pinch roller shaft 108 is disposed in a slot 144 in a support plate 145 to facilitate the movement of the pinch roller assembly 96 into locking relationship with the capstan assembly 140. The pinch roller 100 and a guide 155 may be moved manually between the withdrawn position and the extended position or they may be moved by an actuator 157 (FIG. 1). The actuator 157, the vacuum source 54, the source 92 of pressurized air, the drive motor 123 and the take up motors 20 and 26 may be operated under the control of a controller 159 (FIG. 1).

Figure 5:
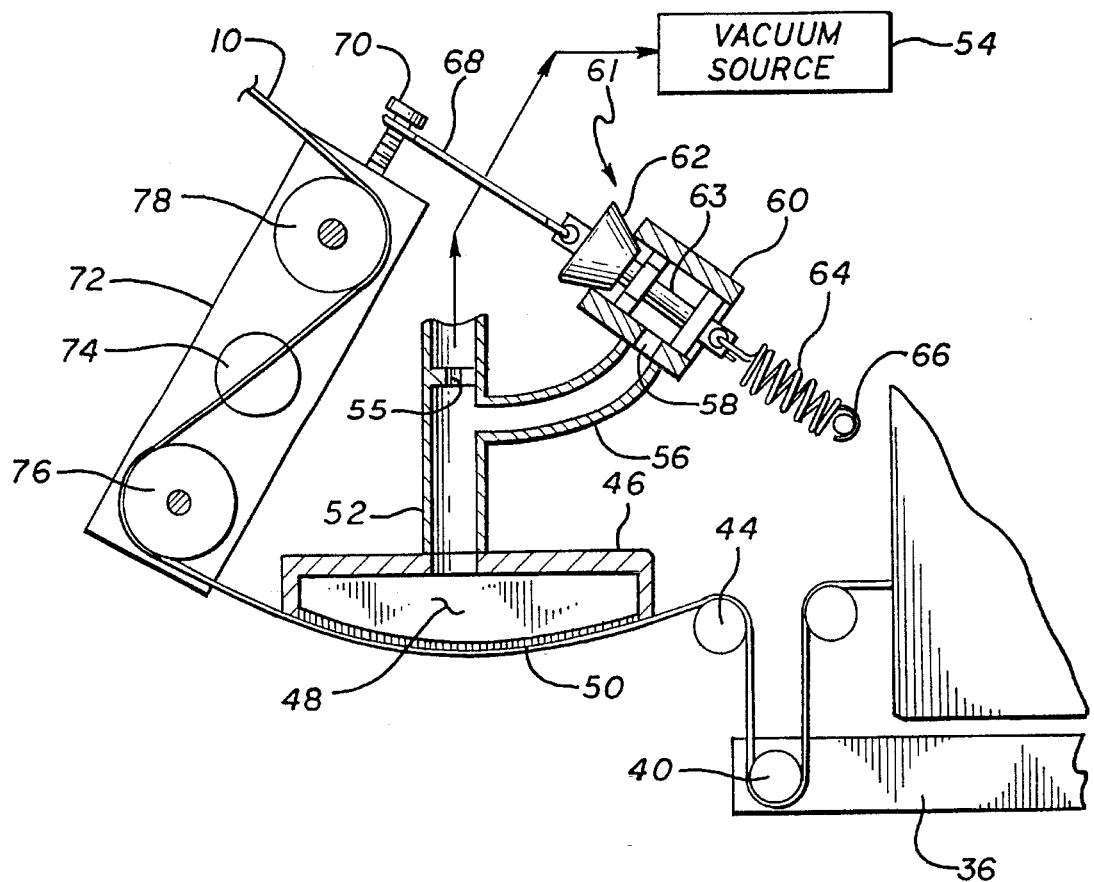
FIG. 5 is an enlarged plan view of the apparatus shown in FIG. 4 and illustrates such apparatus in additional detail.
Figure 6:
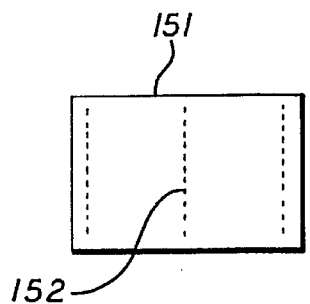
FIG. 6 is an enlarged elevational view of the external surface of the brake shoe (also shown in FIG. 1) associated with the slave tape.
Figure 7:
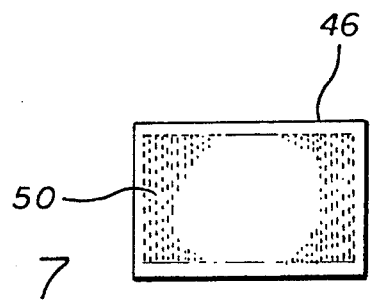
FIG. 7 is an enlarged elevational view of the external surface of the brake shoe (also shown in FIGS. 1, 4 and 5) associated with the master tape.

A brake shoe 151 (FIG. 1) having a construction corresponding to that of the brake shoe 46 is associated with the slave tape 12 in a manner similar to the association between the brake shoe 46 and the master tape 10. However, the periphery of the brake shoe 151 preferably has less apertures 147 (FIG. 6) in its external periphery than the number of apertures 50 (FIGS. 5 and 7) in the brake shoe 46. This provides for a lower braking action by the brake shoe 151 than the braking action provided by the brake show 46. However, depending upon the characteristics of the master tape 10 and the slave tape 12, the braking action of the brake shoe 151 may be equal to, or greater than the braking action of the brake shoe 46. The brake shoe 151 is constructed to receive a vacuum from the source 54 in a manner similar to the brake shoe 46 and is provided with a bleeder valve arrangement corresponding to that provided by the valve 61 (FIG. 5). Although the brake shoes 46 and 151 are shown as receiving a vacuum from the source 54, it is preferable to use separate sources for the brake shoes 46 and 151 to enhance the tension controls provided by the brake shoes. When the slave tape 12 leaves the brake shoe 151, it is guided by a structure including posts 152 and 153 respectively corresponding to the posts 76 and 78 for the master tape 10.

Figure 20:
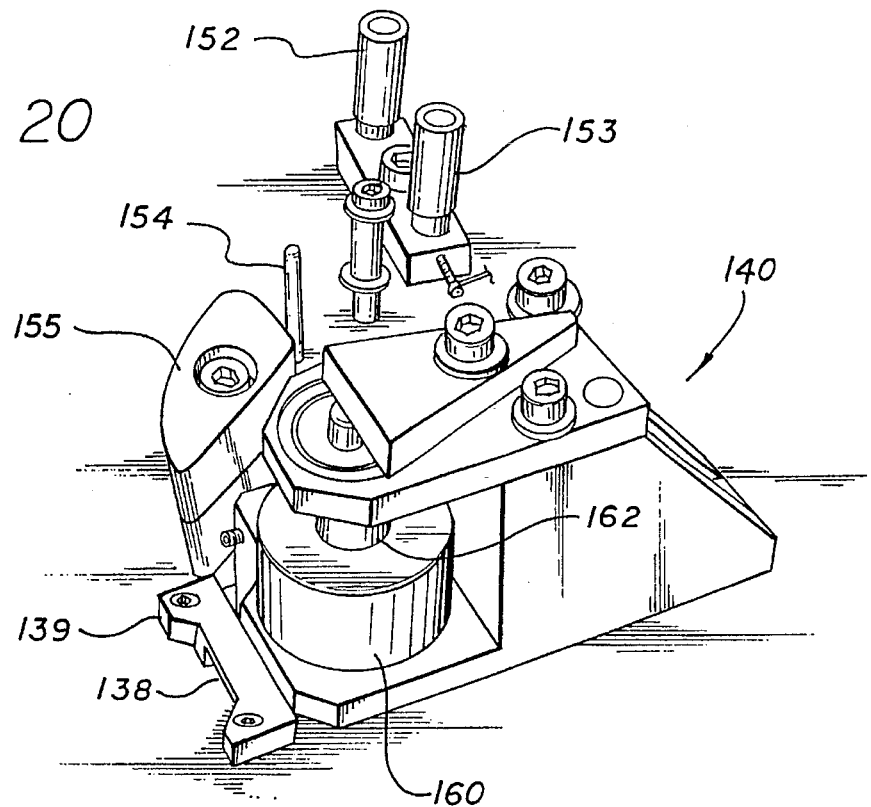
FIG. 20 is an enlarged perspective view of the capstan assembly and associated members, including an associated guide member, for guiding the movement of the slave tape to the capstan, the view being provided from a position above and to one side of these members.
Figure 21:
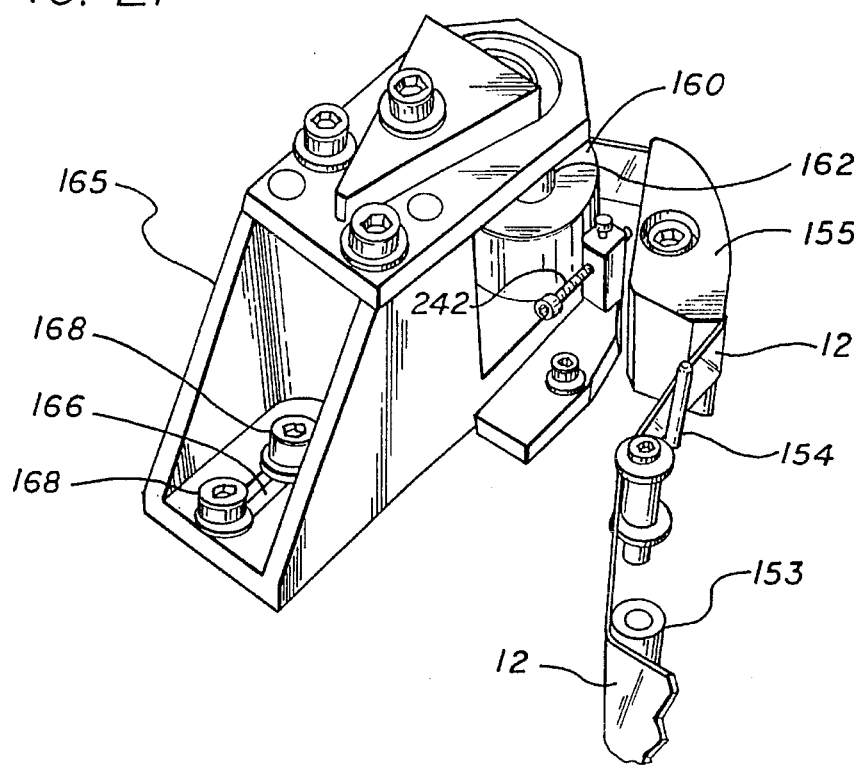
FIG. 21 is an enlarged perspective view of the capstan assembly and the associated members, including the associated guide member, shown in FIG. 20, as seen from a position above and to the other side of these members, and also shows a disposition of the slave tape on these members.

The slave tape 12 is then guided by a pin 154 having a construction and disposition corresponding to the guide pin 80 for the master tape 10. The slave tape 12 then passes to the guide 155 (FIGS. 20 and 21) corresponding to the guide 82 for the master tape. The guide 155 has a construction corresponding to the guide 82 for the master tape. Specifically, the external surface of the guide 155 has an inclined or bevelled surface (see FIG. 9) at its input end and a vertical disposition (see FIG. 10) at its output end. The external surface of the guide 155 may also be provided with apertures (see FIG. 8A) for passing pressurized air from the source 92 (FIG. 1).

The guide 155 is disposed so that the thermomagnetic layer 14 on the slave tape 12 faces outwardly from the external surface of the guide as the slave tape moves along this external surface. As with the relationship between the guide 82 and the pinch roller 100, the guide 155 is positioned close to a capstan 160 in the capstan assembly 140. Although the guide 155 is not adjustably positioned horizontally or vertically in a manner similar to that provided by the eccentrics 104 and 106 (FIGS. 12 and 13) for the guide 82, such adjustments may be provided without departing from the scope of the invention.

The capstan 160 and a shaft 162 (FIGS. 17, 18, 20, and 21) extending from the capstan are preferably formed from a single piece of material. Preferably this material constitutes a stainless steel. Stainless steel is desirable because it has a great rigidity and does not corrode. Stainless steel is also desirable because its external surface can be polished to a fine finish. The capstan 160 and the shaft 162 are preferably constructed so that they have a minimal run-out. For example, the shaft 162 and the capstan 160 are preferably provided with an eccentricity of less than one ten thousandth of an inch (0.0001"). The shaft 162 and the capstan 160 are positioned relative to a support plate 167 in a manner similar to that provided for the shaft 108 by the pins 116 and the bolts 118.

The capstan 160 may be supported by a bearing arrangement (see FIG. 14) similar to that provided for the pinch roller 100. This arrangement includes bearings 161 and lugs 163 FIGS. 15–18 extending from a plate 164 to fixedly position the capstan 160 in the axial direction and inwardly in the radial direction. The capstan assembly 140 is provided with a frame 165 (FIGS. 15 and 21) having a slot 166 in its base for adjustable positioning on a table (not shown) on which the capstan assembly rests. When the capstan assembly 140 has been adjusted to the desired position, the capstan assembly is fixedly positioned on the table by tightening screws 168 extending through the slot 166 to the table. The capstan assembly 140 is adjustably disposed in the frame 165 relative to the fixedly positioned member 139 (FIGS. 16 and 20) which defines at one end the recess 138 for providing the detent relationship with the lug 136 in the pinch roller assembly 96.

A heater generally indicated at 172 (FIGS. 22–23 and 27–28) is disposed between the guide 155 and the capstan 160 to receive the slave tape 12 with the thermomagnetic layer 14 of the slave tape facing the heater. The heater 172 is preferably disposed in contiguous relationship to the guide 155 and the capstan 160. The heater 172 is preferably constructed to heat only the thermomagnetic layer 14 of the slave tape 12 to a temperature above the Curie temperature. If the supporting tape were heated to a temperature above the Curie temperature, the thermomagnetic layer 14 would tend to shrink relative to the supporting tape. This would tend to cause the tape to become excessively cupped and would prevent the image on the master tape 10 from becoming transferred accurately to the slave tape 12. The heater 172 is provided with a relatively short length to prevent the slave tape 12 from becoming blistered by an excessively long time of contact with the heater. For example, this contact between the heater 172 and the slave tape should preferably not exceed five milliseconds (0.005 sec).

The heater 172 is disposed as close as possible to the capstan 160. The thermomagnetic layer 14 on the slave tape 12 becomes heated by the heater 172 to a temperature above the Curie temperature. During the time that the slave tape 12 moves from the heater 172 to the capstan 160, the thermomagnetic layer 14 cools somewhat. Therefore, the heater 172 heats the thermomagnetic layer 14 to a temperature sufficiently above the Curie temperature such that the thermomagnetic layer 14 does not cool below the Curie temperature until after the thermomagnetic layer 14 reaches the capstan and contacts the magnetizable layer 11 of the master tape. This causes the magnetic information on the master tape 10 to be transferred accurately to the thermomagnetic layer 14 on the slave tape 12 without having to use any magnetic heads to obtain such a transfer. Furthermore, since the temperature of the magnetizable layer 11 of the master tape 10, after contacting the thermomagnetic layer 14 of the slave tape 12, can rise only to the average of the temperatures of the magnetizable layer 11 and the thermomagnetic layer 14 before the contact, the characteristics of the master tape 10 are not affected even if the magnetizable layer 11 is a thermomagnetic layer of the same type as that of thermomagnetic layer 14.

The heater 172 is disposed in a particular relationship to the guide 155 and the capstan 160. In this particular relationship, the thermomagnetic layer 14 on the slave tape 12 faces away from the external surfaces of the guide 155 and the capstan 160. In facing away from the external surface of the capstan 160, the thermomagnetic layer 14 directly abuts the magnetizable layer 11 on the master tape 10 (see FIG. 38). In this way, the transfer of the magnetic information on the master tape 10 to the thermomagnetic layer 14 on the slave tape 12 is facilitated. However, the thermomagnetic layer 14 directly faces the external surface of the heater 172. In this way, heat can be transferred directly to the thermomagnetic layer 14 without having to pass through the backing layer supporting the thermomagnetic layer. This facilitates the heating of the thermomagnetic layer 14 to a temperature above the Curie temperature without heating the remainder of the slave tape 12 to such a high temperature.

The heater 172 is relatively short and thin. In this way, the thermomagnetic layer 14 can be heated to a temperature above the Curie temperature without significantly affecting the temperature of the backing layer supporting the thermomagnetic layer. Furthermore, by making the heater 172 short and thin, the heater can be disposed close to the capstan 160. This facilitates the ability of the thermomagnetic layer 14 to operate at a temperature close to the Curie temperature when the information on the master tape 10 is being transferred to the thermomagnetic layer. By making the heater 172 short and thin, the heat from the heater can be transferred to the thermomagnetic layer 14 in a relatively short period of time such as approximately two millisecond (2ms) when the slave tape is moving at a speed of approximately one hundred and fifty inches per second (150 i.p.s.). This is desirable in insuring that only the thermomagnetic layer 14 (and not the supporting tape 12) is heated to a temperature above the Curie temperature. By making the heater short and thin, the surface of the heater disposed near the capstan 160 can be made flat rather than concave as in the prior art. A flat surface has engineering advantages and is significantly simpler to manufacture than a concave surface as in the prior art.

The heater 172 includes a support member 174 (FIGS. 31 and 33). Preferably the support member 174 is made from an insulating member such as a ceramic. Aluminum nitride is a desirable ceramic for certain important reasons. One reason is that it has a low coefficient of thermal expansion. Another reason is that it has a high thermal conductivity. In this way, the support member 174 is able to transfer heat quickly and efficiently to the thermomagnetic layer 14 on the slave tape 12 without changing its physical dimensions appreciably with increases in temperature and without a large thermal gradient. Aluminum nitride is also advantageous because it is relatively stable. Another advantage of aluminum nitride is that its external surface abutting the thermomagnetic layer 14 of the slave tape 12 can be polished to a great smoothness so as to maximize the surface area of contact and thus the heat transfer efficiency. This external surface is indicated at 176 in FIGS. 31 and 32.

The external surface 176 of the support member 174 may define a segment of a cylinder. This cylinder may have a radius of approximately one half of an inch (0.5"). It is desirable that the external surface 176 define a segment of a cylinder in order to assure that pockets of air will not be formed between the external periphery and the slave tape 12 as the slave tape moves along the internal periphery. As will be appreciated, the slave tape 12 moves in the direction of the curvature in the external surface of the support member 174. The maximum thickness of the support member 174 may have a dimension of thirty five thousandths of an inch (0.035").

As indicated at 175 (FIG. 33) at the input side of the insulating member 174, the external surface 176 of the insulating support member 174 may be rounded at its input end in the direction of movement of the slave tape 12 to provide a smaller radius than the radius at intermediate positions on the member. This assures that the slave tape 12 will not form a gap with the external surface 176 as it initially engages the external surface 176 of the member 174 at the input end of the member. The formation of such a gap is undesirable since it creates air pockets which prevent the thermomagnetic layer 14 on the slave tape from being heated uniformly as the slave tape moves on the external surface 176. In like manner, the external surface 176 of the member 174 is rounded as at 177 at the output end with a smaller radius than at intermediate positions on this surface. This also prevents air pockets from being produced between the tape 12 and the external surface 176 of the member 174 at the output end of this surface as the slave tape 12 leaves the member.

The support member 174 has an external surface 178 (FIG. 31) opposite the surface 176. The surface 178 is preferably flat. As a first step in forming the heater 172, the support member 174, when formed from aluminum nitride, is heated to an elevated temperature such as approximately 950° C. in air for a suitable period of time such as approximately two (2) hours. This causes a coating of aluminum oxide to be produced on the external surfaces of the support member 174. This coating of aluminum oxide is desirable in retaining the coatings of materials subsequently deposited on the surfaces of the support member 174.

After the formation of the aluminum oxide on the surface 178 of the support member 174, the surface is subsequently cleaned thoroughly. A layer 180 (FIGS. 31 and 32) of titanium is then deposited on this surface in a suitable thickness such as approximately one thousand Angstrom (1000Å). Titanium has good heat conductivity and a low coefficient of thermal expansion. Then a layer 182 of platinum having a thickness such as approximately four thousand Angstrom (4000Å) is deposited on the titanium. The titanium layer 180 is desirable between the surface 178 of the support member 174 and the platinum layer 182 because titanium has an affinity for aluminum oxide and platinum.

The platinum layer 182 is then annealed at a suitable temperature such as approximately 750° C. for a suitable period of time such as approximately fifteen (15) minutes to soften the platinum. The platinum layer 182 is then cooled at a suitable rate such as approximately three centigrade degrees (3° C.) per minute to room temperature. This annealing of the platinum layer 182 prevents the platinum from cracking when heat and stress are imposed upon the heater 172. It also avoids any problems in the platinum when one side of the heater 172 is at a different temperature than the other side of the heater.

A layer 184 of titanium having a suitable thickness such as approximately one thousand Angstrom (1000Å) is then deposited on the platinum layer 182. A layer 196 of gold having a suitable thickness such as approximately eight thousand Angstrom (8000Å) is then deposited as by sputtering on the titanium layer 184. A layer 188 of gold having a suitable thickness such as one mil (0.001 inch) is then deposited as by plating on the sputtered gold layer. The gold in the laterally middle portion of the layer is then removed to define two (2) terminals 190 and 192 (FIG. 32). The gold layer is sputtered before plating because sputtered gold has a greater affinity for titanium than plated gold. Sputtered gold also has a good affinity for plated gold.

The layers 190 and 192 of plated gold define the terminals for receiving an electrical voltage. This voltage is introduced to the gold layer 190 and 192 by straps 193 (FIG. 23) made from a suitable material such as gold-plated copper. This voltage produces a flow of current through the platinum layer 182 for heating the platinum layer. Preferably the platinum layer has a greater thickness on the input side (in the direction of movement of the slave tape 12) of the heater than on the output side of the heater, as indicated on an exaggerated basis at 194 in FIG. 33. In this way, the platinum 194 layer develops more heat on the input side of the heater than on the output side of the heater. This is desirable in insuring that the temperature in the thermomagnetic layer 14 of the slave tape 12 is brought quickly above the Curie temperature.

The input side of the platinum layer 182 may provide a greater amount of power than the output side of the platinum even with a uniform thickness of the platinum layer. This results from the cooling of the platinum layer by the slave tape 12 as the slave tape contacts the heater. This causes the resistance of the platinum layer at the input side to be lower than the resistance of the platinum layer at the output side. Such differences in resistance value cause the power generated at the input side of the platinum layer to be greater than the power generated at the output side of the platinum layer.

The distance between the gold terminals 190 and 192 is preferably greater by a particular distance than the lateral width of the slave tape 12. In this way, the thermomagnetic layer 14 on the slave tape 12 is heated substantially uniformly across the lateral width of the slave tape. With an optimum distance between the inner ends of the terminals 190 and 192 and the lateral peripheries of the slave tape 12, the platinum is able, in the distance between the inner ends of the terminals and the lateral peripheries of the slave tape, to heat the lateral peripheries of the thermomagnetic layer 14 on the slave tape 12 by an optimal amount. This causes the lateral peripheries of the thermomagnetic layer 14 on the slave tape 12 to be maintained at substantially the same temperature as the remainder of the thermomagnetic layer. If the distance between the inner ends of the terminals 190 and 192 and the lateral peripheries of the slave tape 12 is too great, the lateral peripheries of the thermomagnetic layer 14 on the slave tape 12 may tend to become overheated relative to the remainder of the thermomagnetic layer. If this distance is too small, the lateral peripheries of the thermomagnetic layer 14 on the slave tape 12 may tend to become underheated relative to the remainder of the thermomagnetic layer.

When the thermomagnetic layer 14 of the slave tape 12 is moved along the external surface 176 of the support member 174, the external surface 176 tends to accumulate an electrostatic charge. This electrostatic charge is undesirable since it tends to interfere with the movement of the slave tape and with the transfer of the magnetic image on the master tape 10 to the thermomagnetic layer 14 on the slave tape 12. To eliminate this electrostatic charge, the external surface 176 of the support member 174 may be initially coated with a layer 195 (FIG. 34) of titanium having a suitable thickness such as approximately one thousand Angstrom (1000Å). A layer of an electrically conductive material such as gold 196 having a suitable thickness such as approximately eight thousand Angstrom (8000Å) may then be deposited as by sputtering on the titanium layer. A layer of gold 198 having a suitable thickness such as approximately one mil (1 m) may thereafter be deposited as by plating on the gold layer 196. The layers 194, 196 and 198 are connected to electrical ground and are effective in dissipating electrostatic charges as such electrostatic charges are formed by movement of the slave tape 12 on the external surface 176 of the member 174.

Figure 22:
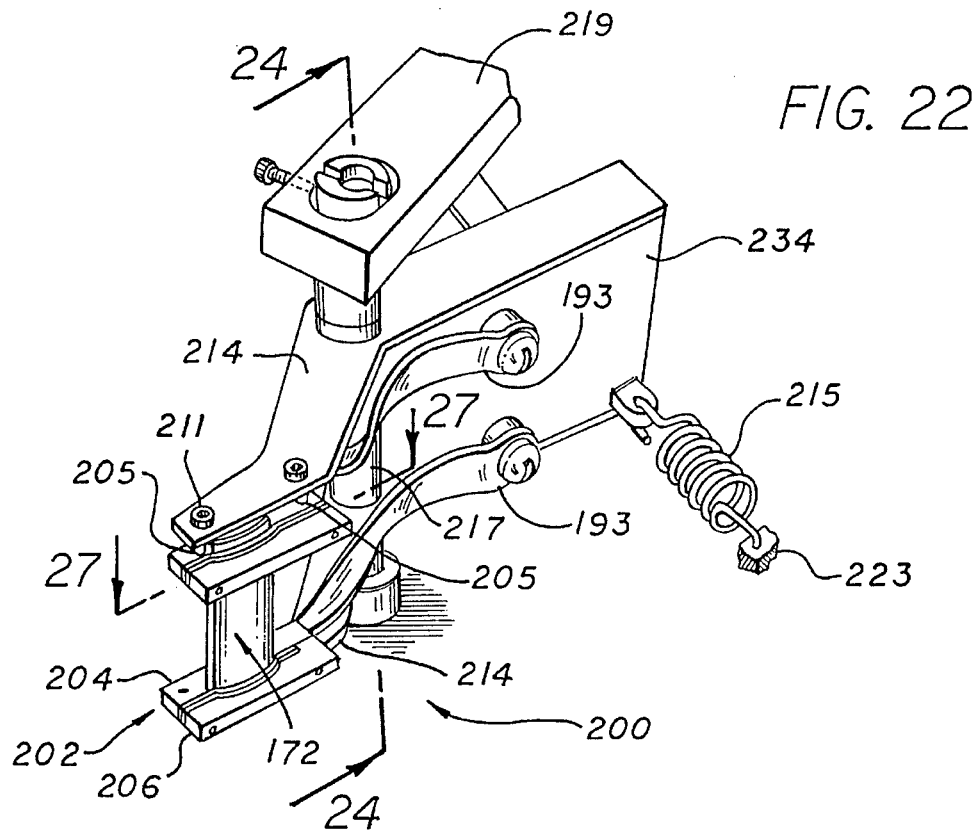
FIG. 22 is an enlarged perspective view of a heater assembly including a heater for heating the thermomagnetic layer on the slave tape to a temperature above the Curie temperature just before the slave tape reaches the capstan, the view being taken from a position above and to one side of the heater assembly.
Figure 23:
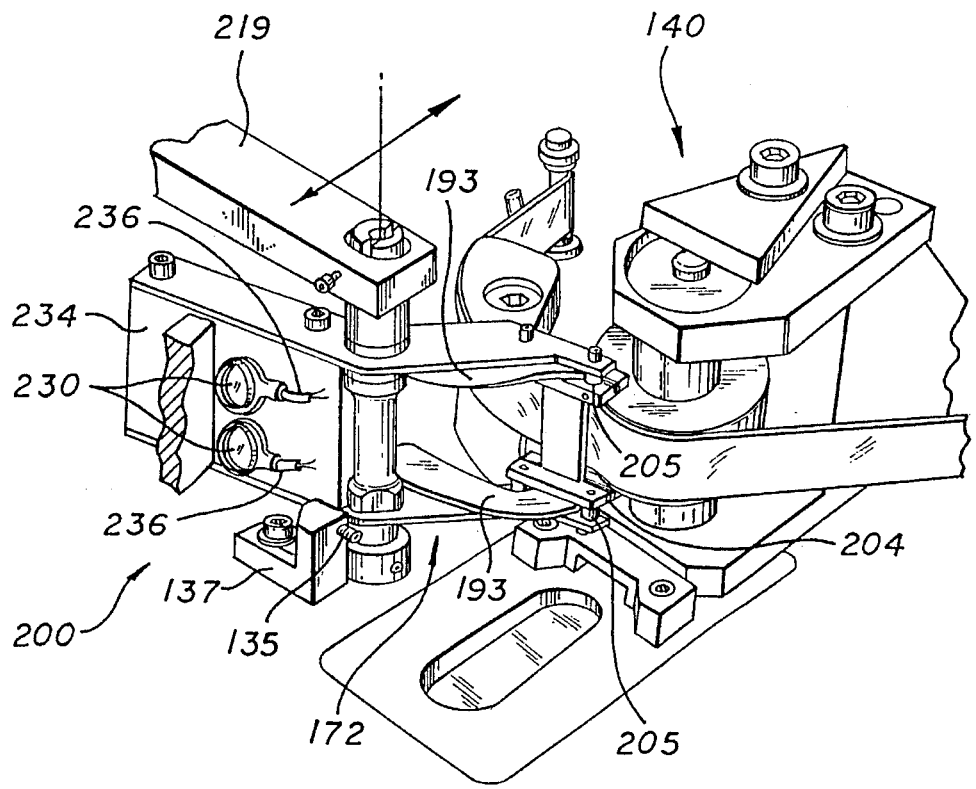
FIG. 23 is an enlarged perspective view of the heater assembly and the capstan assembly and associated guide member as seen from a position above and to the other side of the heater assembly and further illustrates the disposition of the slave tape on the guide member, the heater and the capstan.

The heater 172 is included in a heater assembly generally indicated at 200 (FIGS. 22 and 23). The heater assembly 200 includes a pair of holder assemblies generally indicated at 202 (FIG. 22). The holder assemblies 202 are disposed at the top and bottom of the heater 172 to hold the heater in a fixed position. Each of the holder assemblies 202 includes a pair of positioning members 204 and 206 (FIG. 27) which are clamped to each other as by threaded bolts 208 (FIG. 27). The positioning members 204 and 206 define an internal socket 193 (FIG. 27) for receiving the heater 172. The socket 193 is slightly oversized relative to the heater 172 to provide for any expansion of the heater with heat. Spacers 205 made from a material providing a low heat transfer are disposed adjacent the positioning members 204 and 206 to limit the transfer of heat from the positioning members.

A pair of springs 212 (FIG. 27) are disposed between the positioning members 204 and 206 at the opposite ends of the heater 172 and are disposed on the heater 172 to support the heater in a fixed position within the socket 193. The springs 212 may be made from a suitable material such as Inconel 718. Inconel 718 is desirable because it has good properties at high temperatures and because it does not take a permanent set when heated. The springs 212 are disposed in the internal socket 193 so as to be expansible with increases in temperature. The springs 212 may initially be flat and may be deformed as shown in FIG. 27 when they are disposed on the heater 172. The springs 212 may be provided with an extended slot 213 to provide for expansion relative to the heater 172 and the positioning members 204 and 206.

The heater assembly 202 also includes a pair of bridge members 214 (FIG. 22) which are attached to the heater assembly 200 as at 211 to position the heater 172 in facing relationship with the thermomagnetic layer 14 on the slave tape 12. A shaft 216 (FIG. 24) extends through the bridge members 214 and a support plate 219 to provide for a pivotal movement of the heater 172 to a position abutting the thermomagnetic layer 14 on the slave tape 12 or to a position displaced from the slave tape. When the heater 172 is displaced from the slave tape 12, the disposition of the slave tape on the guide 155 and the capstan 160 can be facilitated.

The heater 172 becomes displaced from the slave tape 12 as by a spring 215 (FIG. 22) which is attached at one end to the heater assembly 200 and at the other end to a fixed post 223. A leaf spring 221 (FIGS. 17 and 18) acts to move the heater assembly toward the capstan 160 (FIG. 17 and 18) as the pinch roller extends.

As shown in FIGS. 22–26, an eccentric 218 is disposed within the support plate 219. As the eccentric 218 is turned, the shaft 216 is moved in a slot 220 (FIG. 26) so as to tilt the heater 172 horizontally. A positioning pin 222 (FIGS. 24 and 25) is threaded in a hole 224 in the support plate 219 to lock the eccentric 218 after the eccentric has been turned to the desired position. An insert 226 (FIG. 24) is disposed on the shaft 216 at a position below the eccentric 218. A Belleville spring 228 (FIG. 24) is disposed on the shaft 216 between the insert 226 and a spacer 233 to hold the insert 226 against the eccentric 218 for maintaining the position of the heater assembly. Electrical insulators 229 and 231 electrically isolate the upper and lower bridge members 214. Electrical terminals 230 (FIGS. 23 and 24) are provided on an insulating block 234 disposed between the bridge members 214 at the end of the bridge members opposite the heater 172. The terminals 230 hold the ends of the straps 193 opposite the heater 172. Electrical leads 236 extend from the terminals 230 to a voltage source (not shown) for producing a current through the platinum layer 182 (FIGS. 31 and 32) or the platinum layer 194 (FIG. 33) to heat the heater.

The heater 172 is locked in position between two opposite pins when it is disposed to receive the slave tape 12 moving from the guide 155 to the capstan 160. One of the pins is disposed on the pinch roller assembly 96 at a position below the guide 155 and is indicated at 240 in FIGS. 12A and 36. The other pin is indicated at 242 in FIGS. 21, 35 and 36 and is adjustably threaded in a fixed support member 244 in FIGS. 35 and 36. The pin 242 is fixedly retained in the support member 244 as by a nut 246. The pins 240 and 242 respectively bear against the opposite surfaces of the lower holder assembly 202. When the heater 172 is positioned between the pins 240 and 242, it still has a slight adjustability such as in the order of a few mils. This provides for a fixed and precise positioning of the slave tape 12 on the heater 172 while still providing for a slight adjustment in this precise positioning.

In order to position the master tape 10 properly on the pinch roller 100 and the slave tape properly on the capstan 160, the pinch roller assembly 96 is moved to a position where the pinch roller is displaced from the capstan. The guide 82 is also movable with the pinch roller 100 to the position displaced from the capstan 160. With the pinch roller 100 and the guide 82 in the displaced positions, the slave tape 12 can be disposed on the capstan 160. The positioning of the slave tape 12 on the capstan 160 is facilitated by the pivotal movement of the heater assembly 200 away from the capstan on the shaft 216 (FIG. 24) as a fulcrum. The movement of the heater assembly 200 away from the capstan is provided by the spring 215 in FIG. 22. After the slave tape 12 has been disposed on the capstan 160, the heater assembly 200 can be released. The heater 172 will then return to the position where it abuts the thermomagnetic layer 14 on the slave tape 12. This is provided by the spring 221 (FIG. 17).

When the slave tape 12 has been disposed on the guide 155, the heater 172 and the capstan 160, the bevelled surface and the ledge on the guide 155 corresponding to the bevelled surface 84 (FIG. 9) and the ledge 86 on the guide 82 position the slave tape so that the slave tape moves to a particular position on the capstan 160. If the slave tape 12 does not move to the particular position on the capstan 160, the position of the guide 155 can be adjusted vertically in accordance with adjustments in an eccentric on the guide 155 corresponding to the eccentric 104 (FIGS. 12 and 13). The position of the guide 155 can also be adjusted vertically, as by a tilting motion, by adjusting an eccentric in the guide 155 corresponding to the eccentric 106 (FIGS. 12, 12A 12B and 13) in the guide 82. In the embodiment constructed, eccentrics corresponding to the eccentrics 104 and 106 on the guide 82 were not provided on the guide 155. However, it will be appreciated that such eccentrics can be provided on the guide 155 without departing form the scope of the invention.

The heater 172 can be tilted by adjusting the position of the eccentric 218 (FIGS. 24–25) in the heater assembly 200. Since the heater 172 is disposed relatively close to the capstan 160, the adjustment provided by the eccentric 218 can be considered to provide a fine control over the positioning of the slave tape 12 on the capstan. In this way, the movement of the slave tape 12 to the capstan 160 can be controlled so that the slave tape has a precise position on the capstan. This is important in insuring that a precise transfer of information is provided from the master tape 10 to the thermomagnetic layer 14 on the slave tape 12 at the abutting positions of the pinch roller 100 and the capstan 160.

Figure 35:
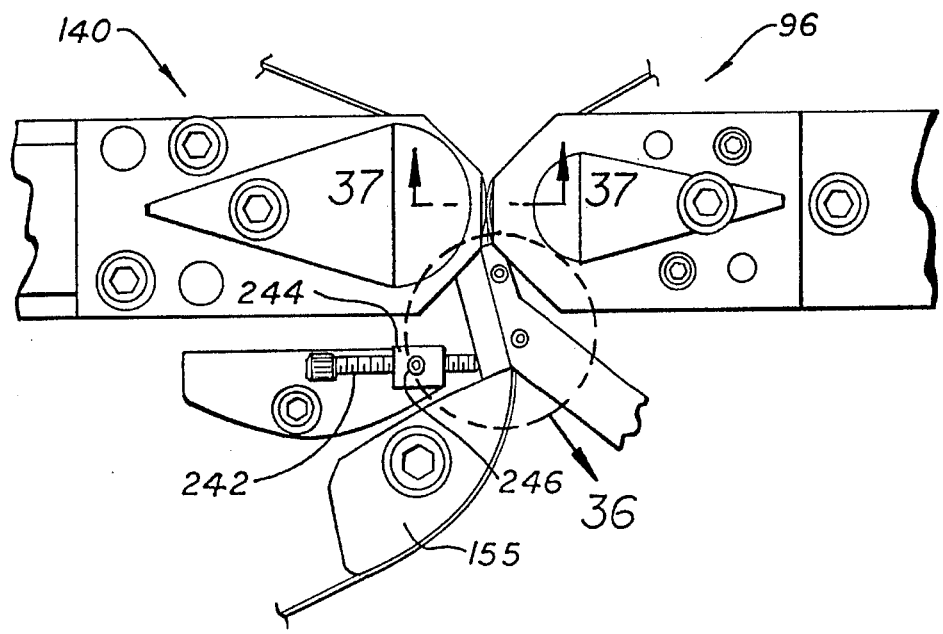
FIG. 35 is an enlarged fragmentary plan view of the pinch roller, the capstan, the guide member associated with the capstan, and the heater assembly in the operative positions of these members.
Figure 36:
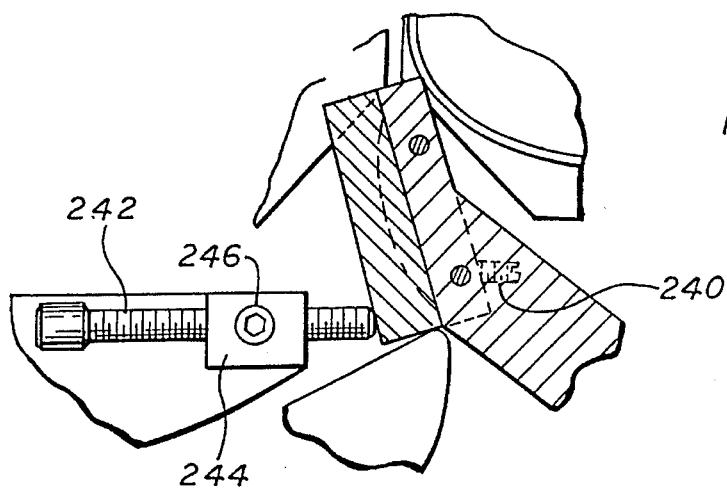
FIG. 36 is an enlarged fragmentary view, partly in section, of the portion of the members shown in FIG. 35 within a broken circle designated by the numeral "36" in FIG. 35.

The master tape 10 is disposed on the guide 82 and the pinch roller 100 while the guide and the pinch roller are displaced from the capstan 160. The guide 82 and the pinch roller 100 are then moved to a position where the pinch roller abuts the capstan. At the end of this movement, the pinch roller 100 becomes locked to the capstan 160 by the locking arrangement between the lug 136 (FIGS. 12, 12A and 12B) on the pinch roller assembly and the recess 138 (FIG. 16) in the capstan assembly 140. When the pinch roller 100 becomes locked to the capstan 160, the heater 172 also becomes locked into position (except for a slight play of a few thousands of an inch) by the pin 240 (FIGS. 12A and 36) on the pinch roller assembly 96 and by the adjustably positioned pin 242 (FIGS. 35 and 36).

The master tape 10 is precisely positioned on the pinch roller 100 by the bevelled surface 84 (FIG. 9) and the ledge 86 on the external surface of the guide 82. The bevelled surface 84 and the ledge 86 cause the master tape 10 to become positioned on the ledge 86 as the master tape 10 moves along the guide 82. The position of the master tape 10 on the pinch roller 96 can be further adjusted by adjusting the eccentrics 104 and 106 (FIGS. 12, 12A, 12B and 13). The eccentric 104 provides a vertical adjustment in the position of the guide 82 and the eccentric 106 provides a horizontal adjustment in the position of the guide albeit at a position displaced from eccentric 104. Thus the eccentric 104 and the eccentric 106 in combination provide an adjustment of the height and the tilt of the guide 82. In this way, the master tape 10 can be directed to a position on the pinch roller 100 precisely corresponding to the position of the slave tape 12 on the capstan 160.

As will be appreciated, the master tape 10 is strained in one direction by the bevel or incline in the surface 84 (FIG. 9) in the guide 82. This strain in one direction is compensated in the other direction by the pin 80 (FIGS. 1 and 11). In like manner, the pin 154 compensates for the strain imposed on the slave tape 12 by the bevel in the surface of the guide 155 corresponding to the bevelled surface 84 in the guide 82.

The brake shoe 46 is included to control the tape tension and to decouple the master tape 10 at a position between the supply reel or cassette 16 and the pinch roller 100. As the tension of the master tape 10 varies at the position of the brake shoe 46, the support member 72 pivots about the pin 74 (FIGS. 1 and 5) as a fulcrum. This causes the position of the spool 62 (FIG. 5) to vary relative to the housing 60 so as to vary the amount of air introduced into the conduit 56 from the valve 61. When the vacuum on the surface of the brake shoe 46 is varied, it varies the tension imposed by the brake shoe on the master tape 10. In this way, the tension of the master tape 10 is regulated.

As will be appreciated, the vacuum shoe 46 develops a variable friction on the master tape 10. In effect, the vacuum brake 46 acts like a loss element in a shock absorber. It damps any variations in the movement of the master tape 10 by imposing a variable friction force on the master tape 10 dependent upon variations in the tension of the master tape. The brake shoe 46 contributes no mass to the tape thereby enhancing its decoupling and control ability.

Stated differently, the master tape 10 has a spring effect, particularly since there is a relatively long tape distance between the supply reel or cassette 16 and the pinch roller 100. The vacuum shoe 46 minimizes any deviations in the movement of the master tape 10 as a result of this spring effect so that the master tape 10 can move at a substantially constant speed to the capstan 160. This is important in insuring that the information on the master tape 10 is recorded accurately on the thermomagnetic layer 14 of the slave tape 12.

As will be appreciated, the brake shoe 151 performs the same function on the slave tape 12 as the brake shoe 46 performs on the master tape 10. However, the brake shoe 151 for the slave tape 12 can have less apertures than the brake shoe 46 for the master tape. This may be seen from a comparison of FIGS. 6 and 7. The increased braking action provided by the brake shoe 46 relative to that provided by the brake shoe 151 results from the fact that the slave tape 12 is expanded by the heater 172 as it moves over the heater. In effect, the increased braking action of the brake shoe 46 stretches the master tape 10 to conform to the stretching provided on the slave tape 12 by the heater 172.

Since each of the brake shoes 46 and 151 has apertures which are covered by the respective ones of the tapes 10 and 12, very little air flows through the brake shoes. Therefore, the vacuum source 54 can be small and can have a low capacity. For example, a diaphragm type of aquarium pump can be used as the vacuum source 54. A "Supra 4" pump distributed by Willinger Brothers of Wrightway Oakland, N.J., has been found satisfactory for use as the vacuum source 54 but a number of other pumps can also be used. This pump is designed as a pressure pump. It can be easily modified to provide a vacuum source by reversing the inlet and outlet ports and adjusting the diaphragm position.

FIG. 39 is a schematic block diagram of a system for regulating the heat produced by the heater 172 and for providing an almost instantaneous heating of the heater on a regulated basis when the apparatus shown in FIGS. 1–38 initially becomes operative. The system shown in FIG. 39 includes a potentiometer 280 having an adjustable arm 282. The voltage on the adjustable arm 282 is introduced to a circuit 284 which multiplies the adjustable voltage by a transfer function such as a time constant to obtain a signal representing the desired amount of power to be introduced to the heater 172.

The signal from the time constant circuit 284 is introduced to a comparator 286 which also receives a signal input from a wattmeter 288. The output from the comparator 286 is introduced to an integrator 290. The output from the integrator 290 in turn passes to a stage 292 for obtaining a square root of the output from the integrator. The output from the square root stage 292 then passes to a multiplier 294 which also receives a signal on a line 296. The signal on the line 296 is an alternating signal having a particular waveform such as a sine wave or a square wave. A power amplifier 298 receives the output signal from the multiplier 294 and introduces an amplified signal to the heater 172. The input current and voltage to the heater are introduced to the wattmeter 288.

As will be seen, the system shown in FIG. 39 constitutes a closed loop servo for regulating the power introduced to the heater 172 in accordance with a desired amount of power represented by the voltage on the adjustable arm 282 of the potentiometer 280. This voltage is varied by the time constant provided by the stage 284. The resultant signal represents the desired power to be introduced to the heater 172.

The resultant signal from the stage 284 is introduced to the comparator 286 for comparison with the signal from the wattmeter 288. The signal from the wattmeter 288 represents at each instant the amount of power generated by the heater 172 at that instant. The output from the comparator 286 accordingly represents at each instant any difference between the desired power and the actual power introduced to the heater 172 at that instant.

The difference signal from the comparator 286 is introduced to the integrator 290 which integrates the difference signal at progressive instants of time. The output from the integrator 290 is introduced to the stage 292 which determines at each instant the square root of the output from the integrator 290. The output from the stage 292 accordingly represents the power introduced to the heater 172 at that instant.

The square root output from the stage 292 is in the form of a variable direct voltage. This signal is introduced to the multiplier 294 for multiplication with an alternating signal, such as a sine wave signal or a square wave signal, on the line 296. The resultant alternating signal is amplified by the amplifier 298 and the amplified signal is introduced to the heater 172.

In this way, the heat produced in the heater 172 at each instant is regulated in accordance with a desired amount of heat as represented by the voltage on the adjustable arm 282 of the potentiometer 280. The square root function 292 assures that the power into the heater is a linear function of the position of the potentiometer arm 282. Without the square root function 292, small changes in the position of the potentiometer arm 282 at typical operating power will cause large changes in the heater power. It will be appreciated that the potentiometer 280 can be replaced by other command means such as a digital-to-analog converter connected to a microprocessor. The system shown in FIG. 39 and discussed above provides this regulation on an instantaneous basis. For example, this regulation is provided in less than a second after the slave tape 12 starts to move.

The time constant stage 284 and the integrator 290 may be caged while the system shown in FIGS. 1–38 is not in use. When the time constant stage 284 and the integrator 290 are caged, a low amount of power is introduced to these stages to prepare the system shown in FIG. 39 for instantaneous operation when the transfer of information from the master tape 10 to the slave tape 12 is initiated. When the transfer of information from the master tape 10 to the slave tape 12 is initiated, the time constant stage 284 and the integrator 290 are uncaged.

The system described above has a number of important advantages. It provides a precise transfer of an image on a mirror basis from the master tape 10 to the slave tape 12 after the slave tape has cooled to ambient temperatures. It provides this precise transfer in a minimal period of time For example, a two (2) hour tape of a movie can be transferred from the master tape 10 to the slave tape 12 in a period of approximately thirty (30) seconds. The system is also advantageous in that the master tape 10 can be disposed easily on the pinch roller 100 and the guide member 82 associated with the pinch roller and the slave tape can be disposed easily on the capstan 160, the associated guide member 155 and the heater 172. This is important when images are being transferred from the master tape 10 to the slave tape 12 on a commercial basis where time is important. The system is further advantageous in that the information on the master tape 10 can be transferred to the slave tape 12 without having to use any reading or recording heads.

The system of this invention also has other important advantages. For example, when the slave tape 12 has the thermomagnetic layer 14, the system of this invention heats essentially only the thermomagnetic layer to a temperature above the Curie temperature. This is important in preserving the characteristics of the slave tape 12 for subsequent use and in providing an accurate transfer of information from the master tape 10 to the slave tape 12. The system includes members for maintaining the tension on each of the master and slave tapes substantially constant. This enhances the accuracy in which the information on the master tape 10 is transferred to the slave tape 12. The system of this invention maintains the tensions on the tapes substantially constant and damps any variations in the tape tensions. The system accomplishes this by regulating the tension of the master tape 10 at a position between the supply real and the pinch roller and by regulating the tension of the slave tape 12 at a position between the supply reel and the capstan.

There are other important advantages to the system of this invention. This results from the construction and operation of the guide member 82 in disposing the master tape 10 on the guide member to position the master tape precisely at a particular position on the pinch roller 100. It also results from the adjustability of the guide member 82, both vertically and with regard to its slope, to assure that the master tape 10 moves precisely to the particular position on the pinch roller 100.

The guide member 155 may be constructed and may be adjustable in the same manner as the guide member 82 to position the slave tape 12 precisely at a particular position on the capstan 160 corresponding to the particular position on the pinch roller 100. If there is any deviation between the particular positions on the pinch roller 100 and the capstan 160, the position of the slave tape 12 on the capstan 160 can be fine tuned by adjusting the position of the heater 172 so that the position of the master tape 10 on the pinch roller 100 and the position of the slave tape 12 on the capstan 160 coincides.

The construction of the heater 172 and the disposition of the slave tape 12 on the heater are also advantageous. For example, the slave tape 12 is disposed relative to the heater 172 so that the thermomagnetic layer 14 on the slave tape 12 abuts the surface of the heater. Furthermore the external surface of the heater 172 is shaped to prevent any air bubbles from lifting the slave tape 12 from the heater. The heater 172 is also formed from materials which assure an optimal operation of the heater. The heater 172 is also pivotable to a position displaced from the path of the slave tape to facilitate the disposition of the slave tape on the heater and the capstan 160 and disposition of the master tape 10 on the pinch roller 100.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

We claim:

1. In combination for duplicating the image of a master tape on a slave tape, first cassette means for providing a movement of the master tape, the first cassette means including a first housing and a first supply reel and a first take-up reel in the first housing, second cassette means for providing a movement of the slave tape, the second cassette means including a second housing and a second supply reel and a second take-up reel in the second housing, a capstan, a pinch roller disposed in abutting relationship to the capstan to receive the master tape and the slave tape in abutting relationship between the capstan and the pinch roller to provide for a duplication on the slave tape of the image on the master tape, first means disposed relative to the first cassette means and the capstan and the pinch roller for moving the master tape from the first supply reel in the first housing to a particular position between the capstan and the pinch roller and back to the first take-up reel in the first housing, and second means disposed relative to the second cassette means and the capstan and the pinch roller for moving the slave tape from the second supply reel in the second housing to the particular position between the capstan and the pinch roller, and in abutting relationship with the master tape, and then back to the second take-up reel in the second housing.

2. In combination for duplicating the image of a master tape on a slave tape, first cassette means for providing a movement of the master tape, the first cassette means including a first housing and a first supply reel and a first take-up reel in the first housing, second cassette means for providing a movement of the slave tape, the second cassette means including a second housing and a second supply reel and a second take-up reel in the second housing, a capstan, a pinch roller disposed relative to the capstan in a first position for pressing the master tape and the slave tape against the capstan to provide for the duplication on the slave tape of the image on the master tape, means disposed in co-operative relationship with the pinch roller for disposing the pinch roller in the first position for the duplication on the slave tape of the image on the master tape and for disposing the pinch roller in a second position displaced from the capstan for facilitating the disposition of the master tape on the pinch roller and the disposition of the slave tape on the capstan, first alignment means disposed relative to the master tape in the first position of the pinch roller for guiding the master tape to a particular position on the pinch roller, and second alignment means disposed relative to the slave tape in the first position of the pinch roller for guiding the slave tape to the particular position on the capstan to obtain a duplication on the slave tape of the image on the master tape.

3. In a combination as set forth in claim 2, the first alignment means being constructed to provide a pneumatic force on its periphery, means for providing a pneumatic force on the periphery of the first alignment means to facilitate the movement of the master tape at a substantially uniform tension to the pinch roller, the second alignment means being constructed to provide a pneumatic force on its periphery, and means for providing a pneumatic force on the periphery of the second alignment means to facilitate the movement of the slave tape at a substantially uniform tension to the capstan.

4. In a combination as set forth in claim 2, the slave tape having a thermomagnetic layer constructed to provide a magnetic image on the thermomagnetic layer at temperatures below a Curie temperature and constructed to lose any magnetic information at temperatures at least equal to a Curie temperature, and heater means disposed in contiguous relationship to the capstan at a position near the abutment between the capstan and the pinch roller and constructed to receive the slave tape and provide a heating of the thermomagnetic layer on the slave tape to a temperature at least equal to the Curie temperature and to provide for a retention of the temperature of the thermomagnetic layer on the slave tape at a temperature at least equal to the Curie temperature during the movement of the slave tape from the heater to the position of abutment between the capstan and the pinch roller.

5. In a combination as set forth in claim 4, the heater means being disposed closer to the capstan than the second alignment means and being constructed to provide a controlled transfer of the slave tape from the second alignment means to the heater means without any displacement of the slave tape from the heater means after the transfer of the tape to the heater means and to provide a controlled transfer of the slave tape from the heater means to the capstan without any displacement of the slave tape from the heater means until the slave tape leaves the heater means for movement to the capstan.

6. In a combination as set forth in claim 4, means for positioning the capstan in a locking relationship to the pinch roller in the first positioning of the pinch roller, and means for adjustably positioning the heater to facilitate the movement of the slave tape to the particular position on the capstan.

7. In combination for providing for a transfer of information on a master tape to a slave tape, a capstan, a pinch roller movable relative to the capstan between a first position with the pinch roller abutting the capstan for providing a force between the pinch roller and the capstan to obtain a transfer of the magnetic information on the master tape to the slave tape and a second position displaced from the capstan to facilitate a disposition of the slave tape on the capstan and the master tape on the pinch roller, means for guiding the movement of the pinch roller between the first and second positions, and means associated with the capstan for locking the pinch roller in the first position when the pinch roller has been moved to the first position.

8. In a combination as set forth in claim 7, detent means associated with the pinch roller for co-operating with the locking means on the capstan to lock the pinch roller in a fixed position relative to the capstan in the first position of the pinch roller.

9. In a combination as set forth in claim 8, means associated with the pinch roller for adjusting the disposition of the pinch roller in the first position of the pinch roller to obtain the disposition of the master tape on the pinch roller at a particular position on the pinch roller and for fixing the pinch roller in the adjusted disposition in the first position of the pinch roller.

10. In a combination as set forth in claim 7, the slave tape having a thermomagnetic layer with properties of losing any magnetic information in the thermomagnetic layer at temperatures above a Curie temperature and with properties of receiving the magnetic information on the master tape at temperatures below the Curie temperature, heater means operatively coupled to the capstan and responsive to the movement of the pinch roller to the first position for becoming locked into a fixed position by the pinch roller, the heater means being constructed to heat the thermomagnetic layer on the slave tape to a temperature above the Curie temperature.

11. In a combination as set forth in claim 10, detent means associated with the pinch roller for co-operating with the locking means on the capstan to lock the pinch roller in a fixed position relative to the capstan in the first position of the pinch roller, and means associated with the heater means for adjusting the position in which the heater means becomes locked by the pinch roller with the pinch roller in the first position.

12. In combination for transferring information on a master tape to a slave tape, a capstan for holding the slave tape, a pinch roller for holding the master tape, the pinch roller being movable between first and second positions, the pinch roller abutting the capstan in the first position to press the master tape against the slave tape for a transfer of the information on the master tape to the slave tape, the pinch roller being displaced from the capstan in the second position to facilitate the disposition of the slave tape on the capstan and a disposition of the master tape on the pinch roller, and detent means disposed on the capstan and the pinch roller for locking the pinch roller in a fixed relationship with the capstan in the first position of the pinch roller.

13. In a combination as set forth in claim 12, the information on the master tape being magnetic and the slave tape having a thermomagnetic layer with a Curie temperature above which any magnetic information in the thermomagnetic layer is destroyed and below which magnetic information on the master tape can be transferred to the thermomagnetic layer on the slave tape, and heater means associated with the capstan and disposed in co-operative relationship with the pinch roller to become locked into position by the pinch roller in the first position of the pinch roller, the heater means being constructed to heat the thermomagnetic layer on the slave tape to a temperature above the Curie temperature and to direct the slave tape to the capstan.

14. In a combination as set forth in claim 13, means associated with the heater means for locking the heater means against movement in either of two opposite directions relative to the capstan with the pinch roller in the first position.

15. In a combination as set forth in claim 13, means for applying power to the heater means to heat the thermomagnetic layer on the slave tape to the temperature above the Curie temperature, means for providing a control representing a particular amount of power to be applied to the heater means, and means responsive to differences between the particular amount of power and the actual amount of power applied to the heater means for varying the actual amount of power applied to the heater means to minimize such differences.

16. In a combination as set forth in claim 15, the heater means being constructed to heat essentially only the thermomagnetic layer on the slave tape to a temperature above the Curie temperature, and means for providing a controlled heating of the heater means to obtain a heating of essentially only the thermomagnetic layer on the slave tape.

17. In combination for transferring information on a master tape to a slave tape, a capstan for holding the slave tape, a pinch roller for holding the master tape, the capstan and the pinch roller being disposed in abutting relationship to press the master tape in a first position against the slave tape for a transfer of information on the master tape to the slave tape, the pinch roller being movable relative to the capstan between the first position and a second position displaced from the capstan to facilitate the disposition of the slave tape on the capstan and the master tape on the pinch roller, means for locking the pinch roller to the capstan in the first position of the pinch roller, and guide means movable with the pinch roller during the movement of the pinch roller to the first position and operative in the first position of the pinch roller to guide the master tape to the pinch roller.

18. In a combination as set forth in claim 17, the guide means constituting first guide means, the first guide means being constructed to direct the master tape to a particular position on the pinch roller, and second guide means associated with the capstan for directing the slave tape to the particular position on the capstan.

19. In a combination as set forth in claim 17, means on the guide means for initially positioning the master tape at an angle to the vertical plane and for thereafter vertically positioning the master tape to facilitate the transfer of the master tape to the particular position on the pinch roller.

20. In a combination as set forth in claim 17, means for supplying progressive positions on the master tape to the pinch roller, and means disposed between the supply means for the master tape and the pinch roller for decoupling the pinch roller from such supply means to regulate the tension of the master tape.

21. In combination for transferring magnetic information on a master tape to a thermomagnetic layer on a slave tape where the thermomagnetic layer has a Curie temperature above which any magnetic information in the thermomagnetic layer is destroyed and below which the magnetic information on the master tape can be transferred to the thermomagnetic layer on the slave tape, a capstan for holding the slave tape, a pinch roller disposed in abutting relationship to the capstan for holding the master tape to obtain a transfer of the magnetic information on the master tape to the thermomagnetic layer on the slave tape, heater means adjustably disposed between the first guide means and the capstan for heating the slave tape to a temperature above the Curie temperature and for guiding the slave tape to the particular position on the capstan, first guide means disposed relative to the capstan and constructed to guide the slave tape to a particular position on the heater means without contact between the slave tape and the first guide means, and second guide means disposed relative to the pinch roller and constructed to guide the master tape to a position on the pinch roller corresponding to the particular position on the capstan without contact between the master tape and the second guide means.

22. In a combination as set forth in claim 21, a first reel for holding the slave tape, means for unwinding the slave tape from the first reel, means disposed between the first reel and the first guide means for regulating the tension of the slave tape, a second reel for holding the master tape, means for unwinding the master tape from the second reel, and means disposed between the second reel and the second guide means for regulating the tension of the slave tape.

23. In a combination as set forth in claim 22, the first reel and a third reel being disposed in a first housing and being included with the first housing in first VCR cassette means, the third reel being disposed to wind the slave tape after the transfer of magnetic information from the master tape to the thermomagnetic layer on the slave tape, the second reel and a fourth reel being disposed in a second housing and being included with the second housing in second VCR cassette means, the fourth reel being disposed to wind the master tape after the transfer of magnetic information from the master tape to the thermomagnetic layer on the slave tape.

24. In a combination as set forth in claim 23, the pinch roller being movable between a first position in the abutting relationship with the capstan and a second position in a displaced relationship with the capstan to facilitate the disposition of the slave tape on the capstan and the disposition of the master tape on the pinch roller.

25. In combination for transferring magnetic information on a master tape to a thermomagnetic layer on a slave tape where the thermomagnetic layer on the slave tape has a Curie temperature above which the magnetic information in the thermomagnetic layer is destroyed and below which the magnetic information in the master tape can be transferred to the thermomagnetic layer on the slave tape, a capstan for holding the slave tape, a pinch roller for holding the master tape in abutting relationship with the thermomagnetic layer on the slave tape, heater means disposed in contiguous relationship to the capstan at a position in front of the capstan in the direction of the movement of the slave tape for heating the thermomagnetic layer on the slave tape to a temperature above the Curie temperature before the movement of the slave tape to the capstan, first guide means disposed at a position in front of the heater means in the direction of movement of the slave tape for guiding the movement of the slave tape to the heater means without contact between the slave tape and the first guide means, a first cassette for holding the slave tape in a wound relationship and having a first supply reel for providing for an unwinding of the slave tape and having a first take-up reel for receiving the slave tape unwound from the first supply reel, second guide means disposed at a position in front of the pinch roller in the direction of movement of the master tape for guiding the movement of the master tape to the pinch roller without contact between the master tape and the second guide means, a second cassette for holding the master tape in a wound relationship and having a second supply reel for providing for an unwinding of the master tape and having a second take-up reel for receiving the master tape unwound from the second supply reel, first control means disposed between the first supply reel and the first guide means for damping variations in the movement of the slave tape between the first supply reel and the capstan as a result of spring characteristics in the portion of the slave tape between the first supply reel and the capstan, and second control means disposed between the second supply reel and the second guide means for damping variations in the movement of the master tape between the second supply reel and the pinch roller as a result of spring characteristics in the portion of the master tape between the second supply reel and the pinch roller.

26. In a combination as set forth in claim 25, the first control means including means for producing a first braking action on the slave tape, and the second control means including means for producing a second braking action on the master tape where the second braking action and the first braking action, the second control means having braking characteristics different from the braking action of the first control means to compensate for the expansion produced on the slave tape by the heater means.

27. In a combination as set forth in claim 26 wherein the braking means in the first control means produces a first particular vacuum force on the slave tape and wherein the braking means in the second control means produces a second particular vacuum force on the master tape to compensate for the expansion produced on the slave tape by the heater means.

28. In a combination as set forth in claim 27 wherein the braking means in the first control means includes a first braking shoe having a surface for receiving the slave tape, the first braking shoe having characteristics at the receiving surface for producing the first particular vacuum force on the slave tape and wherein the braking means in the second control means includes a second braking shoe having a surface for receiving the master tape, the second braking shoe having characteristics at the receiving surface for producing the second particular vacuum force on the master tape.

29. In a combination as set forth in claim 25, means for applying power to the thermomagnetic layer on the slave tape to heat the slave tape above the Curie temperature, means for providing a control representing a particular amount of power, and means responsive to differences between the particular amount of power and the amount of power applied to the thermomagnetic layer for varying the amount of power applied to the thermomagnetic layer to minimize such differences.

30. In combination for transferring magnetic information on a master tape to a thermomagnetic layer on a slave tape where the thermomagnetic layer on the slave tape has a Curie temperature above which the magnetic information in the thermomagnetic layer is destroyed and below which the magnetic information on the master tape can be transferred to the thermomagnetic layer on the slave tape, a capstan for holding the slave tape, a pinch roller for holding the master tape in abutting relationship with the thermomagnetic layer on the slave tape, heater means disposed in contiguous relationship to the capstan at a position in front of the capstan in the direction of movement of the slave tape for heating the thermomagnetic layer on the slave tape to a temperature above the Curie temperature before the movement of the slave tape to the capstan, a first cassette for holding the slave tape in a wound relationship and having a first housing and a first supply reel in the first housing for providing for an unwinding of the slave tape and having a first take-up reel in the first housing for receiving the slave tape unwound from the first supply reel, first means for decoupling the first supply reel from the heater means a second cassette for holding the master tape in a wound relationship and having a second housing and a second supply reel in the second housing for providing for an unwinding of the master tape and having a second take-up reel in the second housing for receiving the master tape unwound from the second supply reel, and second means for decoupling the second supply reel from the pinch roller, the regulation provided by the second means on the master tape being different from the regulation provided by the first means on the slave tape to compensate for the expansion of the slave tape by the heater means.

31. In a combination as set forth in claim 30 wherein the first means includes means for producing a first vacuum force on the slave tape to damp variations in the movement of the slave tape from the first supply reel to the heater means and then to the capstan, and the second means includes means for producing a second vacuum force on the master tape to damp variations in the movement of the master tape from the second supply reel to the pinch roller where the the second vacuum force is different from the first vacuum force to compensate for the expansion of the slave tape by the heater means.

32. In a combination as set forth in claim 30, the pinch roller being movable between a first position in abutting relationship with the capstan and a second position displaced from the capstan, and detent means on the capstan and the pinch roller for locking the pinch roller to the capstan in the first position of the pinch roller.

33. In a combination as set forth in claim 32, third means for guiding the slave tape to the capstan, means associated with the heater means for adjusting the disposition of the heater means to facilitate the movement of the slave tape to the particular position on the capstan, fourth means for guiding the master tape to the pinch roller, and means associated with the fourth means for adjusting the disposition of the fourth means to obtain a movement of the master tape by the fourth means to a position on the pinch roller corresponding to the particular position on the capstan.

34. In a combination as set forth in claim 33, the third means being constructed to receive a pneumatic force at its periphery, means for producing a pneumatic force on the periphery of the third means to regulate the tension of the slave tape on the third means, the fourth means being constructed to receive a pneumatic force on the periphery of the fourth means, and means for producing a pneumatic force on the periphery of the fourth means to regulate the tension of the master tape on the fourth means.

35. A method of transferring magnetic information from a magnetizable layer on a master tape to a slave tape where the slave tape has a thermomagnetic layer with a Curie temperature above which any magnetic information in the thermomagnetic layer on the slave tape is destroyed and below which any magnetic information on the magnetizable layer of the master tape can be transferred to the thermomagnetic layer on the slave tape, including the steps of:

guiding the movement of the master tape to a pinch roller for disposition with the magnetizable layer facing away from the pinch roller, guiding the movement of the slave tape to a capstan disposed in abutting relationship with the pinch roller such that the thermomagnetic layer on the slave tape abuts the magnetizable layer on the master tape, and passing the slave tape over a heater, during the movement of the slave tape to the capstan, with the thermomagnetic layer of the slave tape facing the heater, and heating the heater to obtain a temperature of the thermomagnetic layer on the slave tape to a temperature above the Curie temperature, adjusting the movement of the master tape to the pinch roller to provide a particular disposition of the master tape on the pinch roller, adjusting the movement of the slave tape to the capstan to provide a particular disposition of the slave tape on the capstan, the particular disposition of the master tape on the pinch roller coinciding with the particular disposition of the slave tape on the capstan, damping variations in the movement of the master tape to the pinch roller, and damping variations in the movement of the slave tape to the capstan.

36. A method as set forth in claim 35 wherein power is applied to the thermomagnetic layer on the slave tape to heat substantially only the thermomagnetic layer of the slave tape.

37. A method as set forth in claim 36 including the steps of:

moving the pinch roller to a position displaced from the capstan to facilitate the disposition of the master tape on the pinch roller and the disposition of the slave tape on the capstan, and thereafter moving the pinch roller into abutting relationship with the capstan to provide for a transfer of the magnetic information on the magnetizable layer of the master tape to the thermomagnetic layer on the slave tape.

38. In combination for transferring magnetic information on a master tape to a thermomagnetic layer on a slave tape where the thermomagnetic layer on the slave tape has a Curie temperature above which the magnetic information in the thermomagnetic layer is destroyed and below which the magnetic information in the master tape can be transferred to the thermomagnetic layer on the slave tape, a capstan, a heater disposed adjacent the capstan and provided with an external configuration defined at a first surface by a segment of a cylinder and at an opposite surface by a planar configuration, the heater being disposed relative to the capstan to receive the slave tape with the thermomagnetic layer abutting the first surface of the heater and being further disposed relative to the capstan to provide for the movement of the slave tape to the capstan with the thermomagnetic layer on the slave tape displaced from the capstan.

39. In combination for transferring magnetic information on a master tape to a thermomagnetic layer on a slave tape where the thermomagnetic layer on the slave tape has a Curie temperature above which the magnetic information in the thermomagnetic layer is destroyed and below which the magnetic information in the master tape can be transferred to the thermomagnetic layer on the slave tape, a capstan, a heater disposed adjacent the capstan and provided with an external configuration defined at a first surface by a segment of a cylinder and at an opposite surface by a planar configuration, the heater being disposed relative to the capstan to receive the slave tape with the thermomagnetic layer abutting the first surface of the heater and being further disposed relative to the capstan to provide for the movement of the slave tape to the capstan with the thermomagnetic layer on the slave tape displaced from the capstan, the heater being provided with a length to heat the thermomagnetic layer of the slave tape for a time no greater than five milliseconds (0.005 sec.) during the movement of the slave tape on the heater.

40. In combination for transferring magnetic information on a master tape to a thermomagnetic layer on a slave tape where the thermomagnetic layer on the slave tape has a Curie temperature above which the magnetic information in the thermomagnetic layer is destroyed and below which the magnetic information in the master tape can be transferred to the thermomagnetic layer on the slave tape, a capstan, a heater disposed adjacent the capstan and provided with an external configuration defined at a first surface by segment of a cylinder and at an opposite surface by a planar configuration, the heater being disposed relative to the capstan to receive the slave tape with the thermomagnetic layer abutting the first surface of the heater and being further disposed relative to the capstan to provide for the movement of the slave tape to the capstan with the thermomagnetic layer on the slave tape displaced from the capstan, and means disposed in co-operative relationship with the heater for heating the heater to obtain the heating of substantially only the thermomagnetic layer on the slave tape to a temperature above the Curie temperature.

41. In combination for transferring magnetic information on a master tape to a thermomagnetic layer on a slave tape where the thermomagnetic layer on the slave tape has a Curie temperature above which the magnetic information in the thermomagnetic layer is destroyed and below which the magnetic information in the master tape can be transferred to the thermomagnetic layer on the slave tape, a capstan, and a heater disposed adjacent the capstan and provided with an external configuration defined at a first surface by a segment of a cylinder and at an opposite surface by a planar configuration, the heater being disposed relative to the capstan to receive the slave tape with the thermomagnetic layer abutting the first surface of the heater and being further disposed relative to the capstan to provide for the movement of the slave tape to the capstan with the thermomagnetic layer on the slave tape displaced from the capstan, the heater being shaped to inhibit the formation of air pockets between the heater and the slave tape upon the movement of the slave tape to the heater and the movement of the slave tape from the heater.

42. In a combination as set forth in claim 41, the heating means providing for the flow of an electrical current through the heating means to heat the heater.

43. In a combination as set forth in claim 38, the heater being adjustable in position to provide for the movement of the slave tape to a particular position on the capstan.

44. In combination for transferring magnetic information on a master tape to a thermomagnetic layer on a slave tape where the thermomagnetic layer has a Curie temperature above which magnetic information in the thermomagnetic layer is destroyed and below which magnetic information on the master tape can be transferred to the slave tape, a capstan having a surface for receiving the slave tape, a pinch roller having a surface for receiving the master tape, the pinch roller being disposed in abutting relationship to the capstan, a heater disposed in contiguous relationship to the capstan for heating the thermomagnetic layer on the slave tape above the Curie temperature, means for applying power to the heater to heat the heater for producing a temperature above the Curie temperature in the thermomagnetic layer of the slave tape, and means for regulating the amount of the power applied to the heater to obtain the production of the temperature above the Curie temperature substantially only in the thermomagnetic layer of the slave tape before the slave tape reaches the capstan, and means for driving the pinch roller to obtain a movement of the master tape on the pinch roller and a movement of the slave tape on the capstan for a transfer of the information on the master tape to the slave tape.

45. In a combination as set forth in claim 44, the regulating means providing a control representing a desired amount of power to be applied to the heater, and means responsive to differences in the desired amount of power and the actual amount of power applied to the heater for varying the amount of the power applied to the heater to minimize such differences.

46. In a combination as set forth in claim 45, the regulating means being operative to regulate the amount of the power in the heater to provide for a heating of substantially only the thermomagnetic layer on the slave tape above the Curie temperature.

47. In combination for transferring magnetic information on a master tape to a thermomagnetic layer on a slave tape where the thermomagnetic layer has a Curie temperature above which magnetic information in the thermomagnetic layer is destroyed and below which magnetic information on the master tape can be transferred to the slave tape, a capstan having a surface for receiving the slave tape, a pinch roller having a surface for receiving the master tape, the pinch roller being disposed in abutting relationship to the capstan, a heater disposed in contiguous relationship to the capstan for heating the thermomagnetic layer on the slave tape above the Curie temperature, means for applying power to the heater to heat the heater for producing a temperature above the Curie temperature in the thermomagnetic layer of the slave tape, means for driving the pinch roller to obtain a movement of the master tape on the pinch roller and a movement of the slave tape on the capstan for a transfer of the information on the master tape to the slave tape, the heater being disposed relative to the capstan for receiving the slave tape with the thermomagnetic layer facing the heater and with the thermomagnetic layer facing away from the capstan upon the movement of the slave tape from the heater to the capstan, means for providing an indication of a desired amount of power in the heater, means for determining at each instant any difference between the desired amount of power in the heater and the amount of power actually applied to the heater at such instant, and means responsive to the difference determined at each instant for varying the amount of power introduced to the heater at such instant to minimize such difference.

48. In combination for transferring magnetic information on a master tape to a thermomagnetic layer on a slave tape where the thermomagnetic layer has a Curie temperature above which magnetic information in the thermomagnetic layer is destroyed and below which magnetic information on the master tape can be transferred to the slave tape, a capstan having a surface for receiving the slave tape, a pinch roller having a surface for receiving the master tape, the pinch roller and the capstan being disposed in abutting relationship to provide for a movement of the capstan with the pinch roller, means for providing for a movement of the capstan and the pinch roller to provide for a simultaneous movement of the master tape and the slave tape, heater means disposed in contiguous relationship to the capstan and having a surface for receiving the slave tape and transferring the slave tape to the capstan, means for providing a control representing a particular amount of power to be generated in the heater, means for producing power in the heater to be transferred to the slave tape, and means responsive to differences between the particular amount of power and the amount of power produced in the heater for varying the amount of power produced in the heater to minimize such differences.

49. In a combination as set forth in claim 48, the means providing the control being adjustable to adjust the particular amount of power to be generated in the heater.

50. In a combination as set forth in claim 49, means for providing an adjustment in the positioning of the heater to provide for a movement of the slave tape from the heater to a particular position on the capstan.

51. In a combination as set forth in claim 4, the means for varying the amount of power applied to the heater including means for determining at each instant differences between the particular amount of power and the amount of power produced in the heater at that instant and further including means for varying the amount of power applied to the heater at that instant to minimize such differences.

52. In combination for transferring magnetic information on a master tape to a thermomagnetic layer on a slave tape where the thermomagnetic layer has a Curie temperature above which magnetic information in the thermomagnetic layer is destroyed and below which magnetic information on the master tape can be transferred to the slave tape, a capstan having a surface for receiving the slave tape, a pinch roller having a surface for receiving the master tape, the receiving surfaces of the pinch roller and the capstan being disposed in abutting relationship, first means for driving the pinch roller and the capstan to obtain a movement of the slave tape on the surface of the capstan and a movement of the master tape on the surface of the pinch roller for a transfer of the information on the master tape to the slave tape, a heater for heating the thermomagnetic layer of the slave tape to a temperature above the Curie temperature, the heater being disposed in contiguous relationship to the capstan, second means for providing a signal representing the desired amount of power to be produced in the heater, third means for applying power to the heater, fourth means responsive to the power applied to the heater for providing a signal representing such amount of power, fifth means responsive to the signals representing the desired amount of power and the actual amount of power applied to the heater for producing a signal representing at each instant the difference between the desired amount of power and the actual amount of power, and sixth means responsive at each instant to the difference signal for varying the amount of power applied to the heater at such instant to minimize such difference signal.

53. In a combination as set forth in claim 52, the sixth means including means for integrating the difference signal at each instant and means for producing at each instant a signal representing the square root of the integrated signal at that instant and means responsive at each instant to the signal representing the square root for varying the amount of power applied to the heater at that instant to minimize the difference signal.

54. In a combination as set forth in claim 53, the heater being disposed relative to the capstan to receive the slave tape with the thermomagnetic layer facing the heater and to direct the slave tape to the capstan with the thermomagnetic layer facing away from the capstan, and means for mixing the square root signal with an alternating signal and for applying such mixed signal to the heater to vary the amount of power applied to the heater in a direction for minimizing the difference signal.

55. A method of transferring magnetic information on a master tape to a thermomagnetic layer on a slave tape where the thermomagnetic layer has a Curie temperature above which any magnetic information in the thermomagnetic layer is destroyed and below which magnetic information on the master tape can be transferred to the slave tape, including the steps of:

disposing a capstan and a pinch roller in abutting relationship with the master tape disposed on the pinch roller and the slave tape disposed on the capstan and with the master tape and the slave tape abutting each other, disposing a heater in contiguous relationship to the capstan for heating the thermomagnetic layer on the slave tape above the Curie temperature, applying power to the heater to heat the heater for producing a temperature above the Curie temperature in the thermomagnetic layer of the slave tape, regulating the amount of power applied to the heater at a particular value to obtain the production of the temperature above the Curie temperature substantially only in the thermomagnetic layer of the slave tape, and providing a rotation of the pinch roller and the capstan to obtain movements of the master and the slave tapes past their positions of abutting relationship and to obtain a transfer of the magnetic information on the master tape to the slave tape at the positions of their abutting relationship.

56. A method as set forth in claim 55, including the steps of:

providing the master tape from a supply reel in a first cassette and winding the master tape on a take-up reel in the first cassette after the magnetic information on the master tape has been transferred to the slave tape, and providing the slave tape from a supply reel in a second cassette and winding the slave tape on a take-up reel in the second cassette after the magnetic information on the master tape has been transferred to the slave tape.

57. A method of transferring magnetic information on a master tape to a thermomagnetic layer on a slave tape where the thermomagnetic layer has a Curie temperature above which any magnetic information in the thermomagnetic layer is destroyed and below which magnetic information on the master tape can be transferred to the slave tape, including the steps of:

disposing a capstan and a pinch roller in abutting relationship with the master tape disposed on the pinch roller and the slave tape disposed on the capstan and with the master tape and the slave tape abutting each other, disposing a heater in contiguous relationship to the capstan for heating the thermomagnetic layer on the slave tape above the Curie temperature, applying power to the heater to heat the heater for producing a temperature above the Curie temperature in the thermomagnetic layer of the slave tape, regulating the power applied to the heater to obtain the production of the temperature above the Curie temperature in the thermomagnetic layer of the slave tape, and providing a rotation of the pinch roller and the capstan to obtain movements of the master and the slave tapes past their positions of abutting relationship and to obtain a transfer of the magnetic information on the master tape to the slave tape at the positions of their abutting relationship, providing the master tape from a supply reel in a first cassette and winding the master tape on a take-up reel in the first cassette after the magnetic information on the master tape has been transferred to the slave tape, and providing the slave tape from a supply reel in a second cassette and winding the slave tape on a take-up reel in the second cassette after the magnetic information on the master tape has been transferred to the slave tape, providing an indication of a desired amount of power in the heater, introducing power to the heater, determining at each instant any difference between the desired amount of power in the heater and the amount of power actually introduced to the heater at such instant, and varying the amount of power introduced to the heater in accordance with any such difference to regulate the amount of power introduced to the heater.

58. A method as set forth in claim 57, including the steps of:

providing for the disposition of the pinch roller in a position displaced from the abutting relationship with the capstan to facilitate the disposition of the master tape on the pinch roller and the slave tape on the capstan, and disposing the pinch roller in the abutting relationship with the capstan after the disposition of the master tape on the pinch roller and the slave tape on the capstan.

59. A method as set forth in claim 58, including the step of:

locking the pinch roller and the capstan in the abutting relationship to obtain the movements of the master tape and the slave tape to particular positions respectively on the pinch roller and the capstan for a faithful transfer of the image on the master tape to the slave tape.

60. A method of transferring magnetic information on a master tape to a thermomagnetic layer on a slave tape where the thermomagnetic layer has a Curie temperature above which any magnetic information in the thermomagnetic layer is destroyed and below which the magnetic information on the master tape can be transferred to the slave tape, including the steps of:

providing a capstan for holding the slave tape, providing a pinch roller for holding the master tape, providing for a disposition at first times of the pinch roller in a first position displaced from the capstan and at second times different from the first times in a second position abutting the capstan, providing, in the first position of the pinch roller, a disposition of the master tape on the pinch roller and a disposition of the slave tape on the capstan, providing a disposition of the pinch roller in the second position after the disposition of the master tape on the pinch roller and the slave tape on the capstan, locking the pinch roller to the capstan in the second position of the pinch roller, providing a heater in contiguous relationship to the capstan in the second disposition of the pinch roller, heating the heater to obtain a temperature above the Curie temperature in the thermomagnetic layer of the slave tape when the pinch roller is locked in the second position with the capstan, and providing a movement of the pinch roller and the capstan with the master tape on the pinch roller in abutting relationship to the slave tape on the capstan to obtain a transfer of the magnetic information on the master tape to the slave tape.

61. A method as set forth in claim 60, including the steps of:

moving the heater with the pinch roller between the first and second positions of the pinch roller, providing the master tape from a supply reel in a first cassette and winding the master tape on a take-up reel in the first cassette after the information on the master tape has been transferred to the slave tape, and providing the slave tape from a supply reel in a second cassette and winding the slave tape on a take-up reel in the second cassette after the information on the master tape has been transferred to the slave tape.

62. A method of transferring magnetic information on a master tape to a thermomagnetic layer on a slave tape where the thermomagnetic layer has a Curie temperature above which any magnetic information in the thermomagnetic layer is destroyed and below which the magnetic information on the master tape can be transferred to the slave tape, including the steps of:

disposing a master tape on a pinch roller, disposing a slave tape on a capstan in abutting relationship to the master tape on the pinch roller, disposing a heater in contiguous relationship to the capstan to obtain a heating of the thermomagnetic layer on the slave tape to a temperature above the Curie temperature, providing a first guide in contiguous relationship to the pinch roller and providing for a disposition of the master tape on the first guide, providing a second guide in contiguous relationship to the capstan and providing for a disposition of the slave tape on the second guide, providing for a rotation of the pinch roller to obtain a movement of the master tape and the slave tape past the position of abutment and a transfer of the image on the master tape to the slave tape, providing a damped regulation of the tension on the master tape during the movement of the master tape to the first guide, and providing a damped regulation of the tension on the slave tape during the movement of the slave tape to the second guide.

63. A method as set forth in claim 62, including the steps of:

providing the master tape from a supply reel in a first cassette and winding the master tape on a take-up reel in the first cassette after the information on the master tape has been transferred to the slave tape, providing the damped regulation of the tension on the master tape between the supply reel in the first cassette and the first guide, providing the slave tape from a supply reel in a second cassette and winding the slave tape on a take-up reel in the second cassette after the information on the master tape has been transferred to the slave tape, and providing the damped regulation of the tension on the slave tape between the supply reel in the second cassette and the second guide.

64. A method as set forth in claim 63, including the step of:

regulating the power applied to the heater to obtain a controlled transfer of heat to the thermomagnetic layer in the slave tape.

65. A method as set forth in claim 64 wherein the damped regulation of the tension on the master tape minimizes spring effect in the master tape, and the damped regulation of the tension on the slave tape minimizes spring effect in the slave tape.

66. In combination for transferring an image on a master tape to a slave tape, first cassette means for providing a movement of the master tape, the first cassette means including a first housing and a first supply reel and a first take-up reel in the first housing, second cassette means for providing a movement of the slave tape, the second cassette means including a second housing and a second supply reel and a second take-up reel in the second housing, a capstan, a pinch roller disposed in abutting relationship to the capstan to receive the master tape and the slave tape in abutting relationship between the capstan and the pinch roller and to provide for a coordinated movement of the master tape and the slave tape, first means disposed relative to the first cassette means and the capstan and the pinch roller for moving the master tape from the first supply reel in the first housing to a position between the capstan and the pinch roller and back to the first take-up reel in the first housing, and second means disposed relative to the second cassette means and the capstan and the pinch roller for moving the slave tape from the second supply reel in the second housing to a position between the capstan and the pinch roller, in abutting relationship with the master tape, and then back to the second take-up reel in the second housing, means disposed between the first supply reel in the first cassette means and the pinch roller for decoupling the first tape from the first supply reel, means disposed between the second supply reel in the second cassette means and the capstan for decoupling the second tape from the second supply reel, and means for obtaining a transfer of the image on the master tape to the slave tape during the co-ordinated movement of the master and slave tapes.

67. In combination for transferring an image on a master tape to a slave tape, first cassette means for providing a movement of the master tape, the first cassette means including a first housing and a first supply reel and a first take-up reel in the first housing, second cassette means for providing a movement of the slave tape, the second cassette means including a second housing and a second supply reel and a second take-up reel in the second housing, a capstan, a pinch roller disposed in abutting relationship to the capstan to receive the master tape and the slave tape in abutting relationship between the capstan and the pinch roller and to obtain a co-ordinated movement of the master and slave tapes, first means disposed relative to the first cassette means and the capstan and the pinch roller for moving the master tape from the first supply reel in the first housing to a position between the capstan and the pinch roller and back to the first take-up reel in the first housing, and second means disposed relative to the second cassette means and the capstan and the pinch roller for moving the slave tape from the second supply reel in the second housing to a position between the capstan and the pinch roller, in abutting relationship with the master tape, and then back to the second take-up reel in the second housing, means disposed between the first supply reel in the first cassette means and the pinch roller for damping any variations in the movement of the master tape between the first supply reel and the pinch roller, means disposed between the second supply reel in the second cassette means and the capstan for damping any variations in the movement of the master tape between the second supply reel and capstan, and means for obtaining a transfer of the image on the master tape to the slave tape during the coordinated movements of the master and slave tapes.

68. In combination for transferring an image on a master tape to a slave tape, first cassette means for providing a movement of the master tape, the first cassette means including a first housing and a first supply reel and a first take-up reel in the first housing, second cassette means for providing a movement of the slave tape, the second cassette means including a second housing and a second supply reel and a second take-up reel in the second housing, a capstan, a pinch roller disposed in abutting relationship to the capstan to receive the master tape and the slave tape in abutting relationship between the capstan and the pinch roller and to provide for a co-ordinated movement of the master and slave tapes, first means disposed relative to the first cassette means and the capstan and the pinch roller for moving the master tape from the first supply reel in the first housing to a position between the capstan and the pinch roller and back to the first take-up reel in the first housing, and second means disposed relative to the second cassette means and the capstan and the pinch roller for moving the slave tape from the second supply reel in the second housing to a position between the capstan and the pinch roller, in abutting relationship with the master tape, and then back to the second take-up reel in the second housing, means disposed between the first supply reel in the first cassette means and the pinch roller for providing a variable friction force on the master tape to regulate the movement of the master tape to the pinch roller, and means disposed between the second supply reel in the second cassette means and the capstan for providing a variable friction force on the slave tape to regulate the movement of the slave tape to the capstan.

69. In combination for transferring an image on a master tape to a slave tape, first cassette means for providing a movement of the master tape, the first cassette means including a first housing and a first supply reel and a first take-up reel in the first housing, second cassette means for providing a movement of the slave tape, the second cassette means including a second housing and a second supply reel and a second take-up reel in the second housing, a capstan, a pinch roller disposed in abutting relationship to the capstan to receive the master tape and the slave tape in abutting relationship between the capstan and the pinch roller and to provide for a movement of the master tape and the slave tape in a co-ordinated relationship, first means disposed relative to the first cassette means and the capstan and the pinch roller for moving the master tape from the first supply reel in the first housing to a position between the capstan and the pinch roller and back to the first take-up reel in the first housing, and second means disposed relative to the second cassette means and the capstan and the pinch roller for moving the slave tape from the second supply reel in the second housing to a position between the capstan and the pinch roller, in abutting relationship with the master tape, and then back to the second take-up reel in the second housing, the master tape having a spring effect during the rotation of the first supply reel, means for minimizing any deviations in the movement of the master tape between the first supply reel and the pinch roller as a result of the spring effect in the master tape, the slave tape having a spring effect during the rotation of the second supply reel, means for minimizing any deviations in the movement of the slave tape between the second supply reel and the capstan as a result of the spring effect in the slave tape, and means for obtaining a transfer of the image on the master tape to the slave tape during the coordinated movements of the master and slave tapes.

70. In a combination as set forth in claim 2, means disposed between the first supply reel and the pinch roller for decoupling the master tape from the first supply'reel to enhance the transfer to the slave tape of the image on the master tape, and means disposed between the second supply reel and the capstan for decoupling the slave tape from the second supply reel to enhance the transfer to the slave tape of the image on the master tape.

71. In a combination as set forth in claim 70, means for imposing a variable friction force on the master tape at a position between the first supply reel and the pinch roller to regulate the movements of the master tape to the particular position on the pinch roller, and means for imposing a variable friction force on the slave tape at a position between the second supply reel and the capstan to regulate the movements of the slave-tape to the particular position on the pinch roller.

72. In a combination as set forth in claim 2, the master tape having a variable spring effect, means for imposing a friction force on the master tape at a position between the first supply reel and the particular position on the pinch roller, means responsive to the variable spring effect in the master tape for varying the friction force on the master tape at the position between the first supply reel and the particular position on the pinch roller to regulate the tension on the master tape, the slave tape having a variable spring effect, means for imposing a friction force on the slave tape at a position between the second supply reel and the particular position on the pinch roller, and means responsive to the variable spring effect in the slave tape for varying the friction force on the slave tape at the position between the second supply reel and the particular position on the pinch roller to regulate the tension on the slave tape.

73. In a combination as set forth in claim 2, means disposed in co-operative relationship with the master tape at a position between the first supply reel and the pinch roller for damping variations in the movement of the master tape, and means disposed in co-operative relationship with the slave tape at a position between the second supply reel and the capstan for damping variations in the movement of the slave tape.

74. In a combination as set forth in claim 20, the supply means including a first supply reel, the decoupling means being operative to provide a variable friction force on the master tape in response to variations in the movement of the master tape to the pinch roller to regulate the tension of the master tape, means including a second supply reel for supplying progressive positions on the slave tape to the capstan, and means disposed between the second supply reel and the capstan for providing a variable friction force on the slave tape in response to variations in the movement of the slave tape to regulate the tension of the slave tape.

75. In a combination as set forth in claim 20, the supply means including a first supply reel, the decoupling means being operative to provide a variable friction force on the master tape in response to variations in the movement of the master tape to the pinch roller to regulate the tension of the master tape, means including a second supply reel for supplying progressive positions on the slave tape to the capstan, and means disposed between the second supply reel and the capstan for providing a variable friction force on the slave tape in response to variation in the movement of the slave tape to regulate the tension of the slave tape.

76. In a combination as set forth in claim 20, the supply means including a first supply reel, means including a second supply reel for supplying progressive positions on the slave tape to the capstan, and means disposed between the supply means for the slave tape and the capstan for decoupling the capstan from such supply means to regulate the tension of the slave tape.

77. A method as set forth in claim 35, including the steps of:

damping variations in the movement of the master tape to the pinch roller, and damping variations in the movement of the slave tape to the capstan.

78. In a method as set forth in claim 35, including the steps of:

unwinding the master tape from a first supply reel in a first cassette for movement of the master tape to the pinch roller and then to a first take-up reel in the first cassette for winding on the first take-up reel, decoupling the master tape from the first supply reel during the movement of the master tape to the pinch roller, unwinding the slave tape from a second supply reel in a second cassette for movement of the slave tape to the capstan and then to a second take-up reel in the second cassette for winding on the second take-up reel, and decoupling the slave tape from the second take-up reel during the movement of the slave tape to the capstan.

79. In a method as set forth in claim 35, including the steps of:

unwinding the master tape from a first supply reel in a first cassette for movement of the master tape to the pinch roller and then to a first take-up reel in the first cassette for winding on the first take-up reel, applying a first friction force to the master tape during the movement of the master tape to the pinch roller to compensate for spring effects in the master tape during such movement, unwinding the slave tape from a second supply reel in a second cassette for movement of the slave tape to the capstan and then to a second take-up reel in the second cassette for winding on the second take-up reel, and applying a second friction force to the slave tape during the movement of the slave tape to the capstan to compensate for spring effects in the slave tape during such movement.

80. In a combination as set forth in claim 39, means disposed in co-operative relationship with the heater for providing a controlled heating of the heater to obtain the heating of substantially only the thermomagnetic layer on the slave tape to a temperature above the Curie temperature.

81. In a combination as set forth in claim 80, the heater being shaped to inhibit the formation of air pockets between the heater and the slave tape during the movement of the slave tape to the heater and the movement of the slave tape from the heater.

82. A method as set forth in claim 57, providing the master tape from a supply reel in a first cassette and winding the master tape on a take-up reel in the first cassette after the magnetic information on the master tape has been transferred to the slave tape, and providing the slave tape from a supply reel in a second cassette and winding the slave tape on a take-up reel in the second cassette after the magnetic information on the master tape has been transferred to the slave tape.

83. A method as set forth in claim 22, the first reel and a third reel being disposed in a first housing and being included with the first housing in first cassette means, the third reel being disposed to wind the slave tape after the transfer of magnetic information from the master tape to the thermomagnetic layer on the slave tape, the second reel and a fourth reel being disposed in a second housing and being included with the second housing in second cassette means, the fourth reel being disposed to wind the master tape after the transfer of magnetic information from the master tape to the thermomagnetic layer on the slave tape.

84. A method as set forth in claim 56, including the steps of:

damping variations in the movement of the master tape between the supply reel in the first cassette and the pinch roller, and damping variations in the movement of the slave tape between the supply reel in the second cassette and the capstan.

85. A method as set forth in claim 57, including the steps of:

decoupling the master tape from the supply reel in the first cassette at a position between the supply reel in the first cassette and the pinch roller, and decoupling the slave tape from the supply reel in the second cassette at a position between the supply reel in the second cassette and the capstan.

86. A method as set forth in claim 58, including the steps imposing a variable friction on the master tape at a position between the supply reel in the first cassette and the pinch roller in accordance with variations in the movement of the master tape at such position to regulate the tension on the master tape, and imposing a variable friction on the slave tape at a position between the supply reel in the second cassette and the capstan in accordance with variations in the movement of the slave tape at such position to regulate the tension on the slave tape.

87. In combination for transferring an image on a master tape to a slave tape at a first particular speed greater than a second particular speed at which the slave tape is moved thereafter to obtain the reproduction of the image transferred to the slave tape, first cassette means for providing a movement of the master tape at the first particular speed, the first cassette means including a first housing and a first supply reel and a first take-up reel in the first housing, second cassette means for providing a movement of the slave tape at the first particular speed, the second cassette means including a second housing and a second supply reel and a second take-up reel in the second housing, a capstan, a pinch roller disposed in abutting relationship to the capstan to receive the master tape and the slave tape in abutting relationship between the capstan and the pinch roller and to provide for a movement of the master tape and the slave tape in a co-ordinated relationship, first means disposed relative to the first cassette means and the capstan and the pinch roller for moving the master tape from the first supply reel in the first housing to a position between the capstan and the pinch roller and back to the first take-up reel in the first housing, second means disposed relative to the second cassette means and the capstan and the pinch roller for moving the slave tape from the second supply reel in the second housing to a position between the capstan and the pinch roller and back to the second take-up reel in the second housing, third means for driving the pinch roller at the first particular speed to obtain a co-ordinated movement of the master and slave tapes at the particular speed, and fourth means for obtaining a transfer of the image on the master tape to the slave tape during the co-ordinated movements of the master and slave tapes at the first particular speed.

88. In a combination as set forth in claim 87 wherein the pinch roller is movable between a first position in abutting relationship to the capstan to provide for the coordinated movements of the master and slave tapes and a second position displaced from the capstan to provide for a threading of the master tape on the pinch roller and a threading of the slave tape on the capstan.

89. In a combination as set forth in claim 87, first pneumatic means disposed between the first cassette means and the pinch roller for guiding the master tape to the pinch roller without friction on the master tape to facilitate the movement of the master tape at a substantially constant tension to the pinch roller, and second pneumatic means disposed between the second cassette means and the capstan for guiding the slave tape to the capstan without friction on the slave tape to facilitate the movement of the slave tape at a substantially constant tension to the capstan.

* * * * *